US010469798B2

(12) United States Patent
Shimizu et al.

(10) Patent No.: US 10,469,798 B2
(45) Date of Patent: Nov. 5, 2019

(54) IMAGE TRANSMISSION/RECEPTION SYSTEM, IMAGE TRANSMISSION DEVICE, IMAGE RECEPTION DEVICE, AND ACTIVE CABLE

(71) Applicant: FUJIKURA LTD., Tokyo (JP)

(72) Inventors: Hiroki Shimizu, Sakura (JP);
Yoshinori Arai, Sakura (JP); Shinya Abe, Sakura (JP)

(73) Assignee: FUJIKURA LTD., Tokyo (JP)

( * ) Notice: Subject to any disclaimer, the term of this patent is extended or adjusted under 35 U.S.C. 154(b) by 24 days.

(21) Appl. No.: 15/405,435

(22) Filed: Jan. 13, 2017

(65) Prior Publication Data

US 2017/0134692 A1   May 11, 2017

Related U.S. Application Data

(63) Continuation of application No. PCT/JP2015/071001, filed on Jul. 23, 2015.

(30) Foreign Application Priority Data

Jul. 23, 2014   (JP) .................................. 2014-150040

(51) Int. Cl.
*H04B 10/077* (2013.01)
*H04B 10/25* (2013.01)
(Continued)

(52) U.S. Cl.
CPC ............. *H04N 7/08* (2013.01); *H04B 10/077* (2013.01); *H04B 10/2503* (2013.01);
(Continued)

(58) Field of Classification Search
None
See application file for complete search history.

(56) References Cited

U.S. PATENT DOCUMENTS 6,502,997 B1 * 1/2003 Lee ...................... H04B 10/801
385/88
6,943,755 B1 * 9/2005 Bartow ................ G02B 27/017
345/7

(Continued)

FOREIGN PATENT DOCUMENTS

CN        1901611 A     1/2007
CN      103503466 A     1/2014
(Continued)

OTHER PUBLICATIONS

Notice of Allowance dated Oct. 10, 2017, issued in counterpart Japanese Application No. 2014-150040, with English translation. (3 pages).

(Continued)

*Primary Examiner* — Li Liu
(74) *Attorney, Agent, or Firm* — Westerman, Hattori, Daniels & Adrian, LLP

(57) ABSTRACT

In an image transmission/reception system (1) including an active cable (10), an image transmission device (camera 30), and an image reception device (grabber 40), a transmission-side connector (11) of the active cable (10) includes a supplying section (111a) for supplying internal information indicative of an internal state of the transmission-side connector (11) to the image transmission device (30), and the image transmission device (30) includes a superimposing section (MUX 35) for superimposing the internal information on an image signal which is to be transmitted to the image reception device (40) via the active cable (10).

14 Claims, 13 Drawing Sheets

(51) Int. Cl.
- *H04N 7/08* (2006.01)
- *H04N 5/38* (2006.01)
- *H04N 5/44* (2011.01)
- *H04N 7/10* (2006.01)
- *H04N 7/22* (2006.01)

(52) U.S. Cl.
CPC ............... *H04N 5/38* (2013.01); *H04N 5/44* (2013.01); *H04N 5/4448* (2013.01); *H04N 7/10* (2013.01); *H04N 7/22* (2013.01)

(56) References Cited

U.S. PATENT DOCUMENTS

| | | | |
|---|---|---|---|
| 7,653,315 B2 * | 1/2010 | Young | H04B 10/2503 345/204 |
| 7,881,614 B2 * | 2/2011 | Ruiz | H04B 10/801 398/128 |
| 2002/0159725 A1 * | 10/2002 | Bucklen | G02B 6/4246 385/101 |
| 2003/0034963 A1 * | 2/2003 | Moon | H04N 7/22 345/204 |
| 2004/0183916 A1 * | 9/2004 | Enomoto | H04N 5/232 348/207.99 |
| 2005/0182876 A1 | 8/2005 | Kim et al. | |
| 2006/0031611 A1 * | 2/2006 | Konda | H04N 7/22 710/72 |
| 2006/0246772 A1 * | 11/2006 | Yamaguchi | G02B 6/4416 439/505 |
| 2007/0022458 A1 | 1/2007 | Son | |
| 2008/0022023 A1 | 1/2008 | Kim et al. | |
| 2008/0267620 A1 * | 10/2008 | Cole | H04B 10/0775 398/17 |
| 2010/0150552 A1 * | 6/2010 | Furuyama | H04B 10/808 398/38 |
| 2012/0167149 A1 | 6/2012 | Toba et al. | |
| 2012/0229706 A1 | 9/2012 | Kabuto | |
| 2013/0104182 A1 | 4/2013 | Zhang et al. | |
| 2013/0183031 A1 * | 7/2013 | Abe | H04B 10/801 398/25 |
| 2013/0183045 A1 * | 7/2013 | Niiho | G02B 6/28 398/142 |
| 2013/0236188 A1 | 9/2013 | Hung et al. | |
| 2013/0294781 A1 * | 11/2013 | Yu | G02B 6/4284 398/141 |
| 2014/0038462 A1 * | 2/2014 | Coffey | G01R 31/08 439/620.15 |
| 2014/0176804 A1 | 6/2014 | Toba et al. | |
| 2014/0186023 A1 * | 7/2014 | Louderback | H04B 10/077 398/16 |
| 2014/0196953 A1 * | 7/2014 | Chitwood | E21B 33/1243 175/57 |
| 2014/0232939 A1 | 8/2014 | Kabuto | |
| 2016/0020912 A1 * | 1/2016 | Charbonneau-Lefort | H04L 12/12 398/139 |
| 2016/0056890 A1 * | 2/2016 | Boldicke | H04B 10/0795 398/25 |
| 2017/0134692 A1 | 5/2017 | Shimizu et al. | |

FOREIGN PATENT DOCUMENTS

| | | |
|---|---|---|
| JP | 2007-116734 A | 5/2007 |
| JP | 2007-535235 A | 11/2007 |
| JP | 2012-60522 A | 3/2012 |
| JP | 4898948 B1 | 3/2012 |
| JP | 2012-124808 A | 6/2012 |
| JP | 2012-142692 A | 7/2012 |
| JP | 2012-191282 A | 10/2012 |
| JP | 2013-192223 A | 9/2013 |
| JP | 6231954 B2 | 11/2017 |

OTHER PUBLICATIONS

International Search Report dated Oct. 13, 2015, issued in counterpart International Application No. PCT/JP2015/071001 (1 page).
Office Action dated Jan. 4, 2019, issued in CN Application No. 201580039293.7, with English translation. (11 pages).
Office Action dated Apr. 2, 2019, issued in counterpart JP Application No. 2015-187210. (1 page).
Decision to Grant a Patent dated Jun. 11, 2019, issued in counterpart JP Application No. 2015-187210, with English translation (3 pages).

* cited by examiner

FIG. 6

| 1 | 2 | 3 | 4 | 5 | 6 | 7 | 8 | 9 | 10 | 11 | 12 | 13 | 14 |
|---|---|---|---|---|---|---|---|---|----|----|----|----|----|
| IDENTIFICATION NUMBER ||||||  PROCESS CODE | ADDRESS ||| DATA ||| CR |
| 000000: COMMON TO ALL CAMERAS 000001~ZZZZZZ: UNIQUE CAMERA/CABLE TERMINAL NUMBER |||||| R: READ MODE W: WRITE MODE A: ACK MODE N: NACK MODE | ADDRESS OF EEPROM/RAM ||| 000~255: DATA WRITTEN INTO EEPROM/RAM ||| 0Dh |

IMAGE TRANSMISSION/RECEPTION SYSTEM, IMAGE TRANSMISSION DEVICE, IMAGE RECEPTION DEVICE, AND ACTIVE CABLE

CROSS-REFERENCE TO RELATED APPLICATIONS

This application is a Continuation of PCT International Application No. PCT/JP2015/071001 filed in Japan on Jul. 23, 2015, which claims the benefit of Patent Application No. 2014-150040 filed in Japan on Jul. 23, 2014, the entire contents of which are hereby incorporated by reference.

TECHNICAL FIELD

The present invention relates to an image transmission device, an image reception device, and an active cable for connecting the image transmission device with the image reception device. Moreover, the present invention relates to an image transmission/reception system including the image transmission device, the image reception device, and the active cable. Further, the present invention relates to an active cable monitoring method and an active cable control method.

BACKGROUND ART

For transmitting an image signal, an active cable is used. Here, the active cable means a cable having ends provided with respective connectors in each of which an active element is embedded. For example, in an active optical cable through which an optical signal is used to transmit an image signal, a light emitting element (E/O conversion section) which is an active element is embedded in a transmission-side connector, and a light receiving element (O/E conversion section) which is an active element is embedded in a reception-side connector.

Patent Literature 1 discloses an active optical cable which is used to connect a camera with a grabber (processing device) and is in conformity to the Camera Link (Registered Trademark) standard.

The active optical cable disclosed in Patent Literature 1 is a composite cable that includes an optical fiber and a metal cable and has one end provided with a transmission-side (camera-side) connector and the other end provided with a reception-side (grabber-side) connector. The optical fiber included in the composite cable is used to transmit, from the camera to the grabber, image signals X0 through X3 together with a clock signal Xclk. The metal cable included in the composite cable can be (1) a shielded line for supplying electric power from the grabber to the camera, (2) a differential line for transmitting an upstream camera control signal SerTC from the grabber to the camera, (3) a differential line for transmitting a downstream camera control signal SerTFG from the camera to the grabber, (4) differential lines for transmitting respective trigger signals CC1 through CC4 from the grabber to the camera, and (5) a differential line for connecting a camera-side micro controller unit (MCU) embedded in the transmission-side connector with a grabber-side MCU embedded in the reception-side connector.

In the active optical cable, the transmission-side connector needs to be controlled (e.g., a magnitude of an electric current to be supplied to the light emitting element embedded in the transmission-side connector is changed) by the grabber in accordance with conditions such as an internal state (e.g., a temperature in the transmission-side connector) of the transmission-side connector or an internal state (e.g., a magnitude of an electric current outputted from the light receiving element embedded in the reception-side connector) of the reception-side connector. Therefore, it is necessary to transmit internal information, which is indicative of an internal state of the transmission-side connector, from the camera-side MCU to the grabber via the grabber-side MCU or to transmit a control signal for controlling the transmission-side connector from the grabber to the camera-side MCU via the grabber-side MCU. The differential line that connects the camera-side MCU embedded in the transmission-side connector with the grabber-side MCU embedded in the reception-side connector is provided in order to achieve such communication.

CITATION LIST

Patent Literature

[Patent Literature 1]
Japanese Patent Application Publication Tokukai No. 2012-60522 (Publication date: Mar. 22, 2012)
[Patent Literature 2]
Japanese Patent Application Publication Tokukai No. 2007-116734 (Publication date: May 10, 2007)

SUMMARY OF INVENTION

Technical Problem

As above described, the active optical cable disclosed in Patent Literature 1 includes the plurality of metal cables in addition to the optical fiber for transmitting an image signal. This configuration has problems that such an active optical cable is low in flexibility and it is difficult to reduce a diameter and a weight of the active optical cable.

In order to solve the problems, it is preferable to reduce the metal cables included in the active optical cable or it is preferable not to provide such metal cables in the active optical cable. For example, if it is possible to omit the differential line for connecting the grabber-side MCU with the camera-side MCU, it is more likely that the problems would be solved.

As an active optical cable which may achieve reduction in size of a connector in addition to reduction in diameter and weight of a cable, a quad small form-factor pluggable (QSFP) active optical cable is known which includes four upstream optical fibers and four downstream optical fibers. It has been studied to replace all cables, except for the shielded line for supplying electric power from the grabber to the camera, with optical cables by utilizing the technique of the active optical cable. In this case, if the differential line for connecting the grabber-side MCU with the camera-side MCU can be omitted, the four downstream optical fibers can be used to transmit the image signals X0 through X3.

Note that Patent Literature 2 discloses a technique in which a downstream camera control signal SerTFG is transmitted from a camera to a grabber while being superimposed on an image signal. However, even with use of the technique disclosed in Patent Literature 2, it is still difficult to omit the differential line for connecting the grabber-side MCU with the camera-side MCU. This is because the internal information that is transmitted from the camera-side MCU to the grabber-side MCU through the differential line is not generated in the camera unlike the downstream camera control signal SerTFG but is generated in the transmission-side connector.

The present invention is accomplished in view of the problems, and its object is to provide an image transmission/reception system which does not require a transmission path (e.g., the above described differential line) for directly connecting a grabber-side MCU and a camera-side MCU in order to transmit internal information, which is indicative of an internal state of a transmission-side connector, from the transmission-side connector to an image reception device.

Solution to Problem

In order to attain the object, an image transmission/reception system in accordance with an aspect of the present invention includes: an active cable which has an end that is provided with a transmission-side connector and has the other end that is provided with a reception-side connector; an image transmission device which is connected with the transmission-side connector; and an image reception device which is connected with the reception-side connector, the transmission-side connector including a supplying section which supplies, to the image transmission device, internal information that is indicative of an internal state of the transmission-side connector, and the image transmission device including a superimposing section which superimposes the internal information, which has been obtained from the transmission-side connector, on an image signal which is to be transmitted to the image reception device via the active cable.

In order to attain the object, the active cable monitoring method in accordance with an aspect of the present invention is an active cable monitoring method for causing an image reception device to monitor a transmission-side connector in an image transmission/reception system which includes (i) an active cable which has an end that is provided with the transmission-side connector and the other end that is provided with a reception-side connector, (ii) an image transmission device which is connected with the transmission-side connector, and (iii) the image reception device which is connected with the reception-side connector, the active cable monitoring method including the steps of: causing the transmission-side connector to supply, to the image transmission device, internal information that is indicative of an internal state of the transmission-side connector; and causing the image transmission device to superimpose the internal information, which has been obtained from the transmission-side connector, on an image signal which is to be transmitted to the image reception device via the active cable.

In order to attain the object, the active cable control method in accordance with an aspect of the present invention is an active cable control method for causing an image reception device to control a transmission-side connector in an image transmission/reception system which includes (i) an active cable which has an end that is provided with the transmission-side connector and the other end that is provided with a reception-side connector, (ii) an image transmission device which is connected with the transmission-side connector, and (iii) the image reception device which is connected with the reception-side connector, said active cable control method comprising the step of: causing the image reception device to superimpose a connector control signal on an image transmission device control signal, the connector control signal being used to control the transmission-side connector, and the image transmission device control signal being (i) used to control the image transmission device and (ii) transmitted to the image transmission device via the active cable; or causing the image reception device to insert the connector control signal into a no-signal period of the image transmission device control signal.

In order to attain the object, the image transmission device in accordance with an aspect of the present invention is an image transmission device which is connectable to a transmission-side connector that is provided at an end of an active cable, the active cable having the other end that is provided with a reception-side connector, the image transmission device including: an obtaining section which obtains, from the transmission-side connector, internal information that is indicative of an internal state of the transmission-side connector; and a superimposing section which superimposes the internal information, which has been obtained from the transmission-side connector, on an image signal which is to be transmitted to the image reception device that is connected with the reception-side connector via the active cable.

In order to attain the object, the active cable in accordance with an aspect of the present invention is an active cable having an end that is provided with a transmission-side connector and the other end that is provided with a reception-side connector, in which: the transmission-side connector includes a supplying section which supplies, to an image transmission device connected with the transmission-side connector, internal information that is indicative of an internal state of the transmission-side connector.

In order to attain the object, the image reception device in accordance with an aspect of the present invention is an image reception device which is connectable to a reception-side connector that is provided at an end of an active cable, the active cable having the other end that is provided with a transmission-side connector, the image reception device including: a superimposing/inserting section which superimposes a connector control signal on an image transmission device control signal or inserts the connector control signal into a no-signal period of the image transmission device control signal, the connector control signal being used to control the transmission-side connector, and the image transmission device control signal being (i) used to control an image transmission device that is connected with the transmission-side connector and (ii) transmitted to the image transmission device via the active cable.

Advantageous Effects of Invention

According to the present invention, it is possible to provide the image transmission/reception system which does not require a transmission path for directly connecting a control section embedded in the transmission-side connector with a control section embedded in the reception-side connector in order to transmit internal information, which is indicative of an internal state of the transmission-side connector, from the transmission-side connector to the image reception device.

Figure 2:
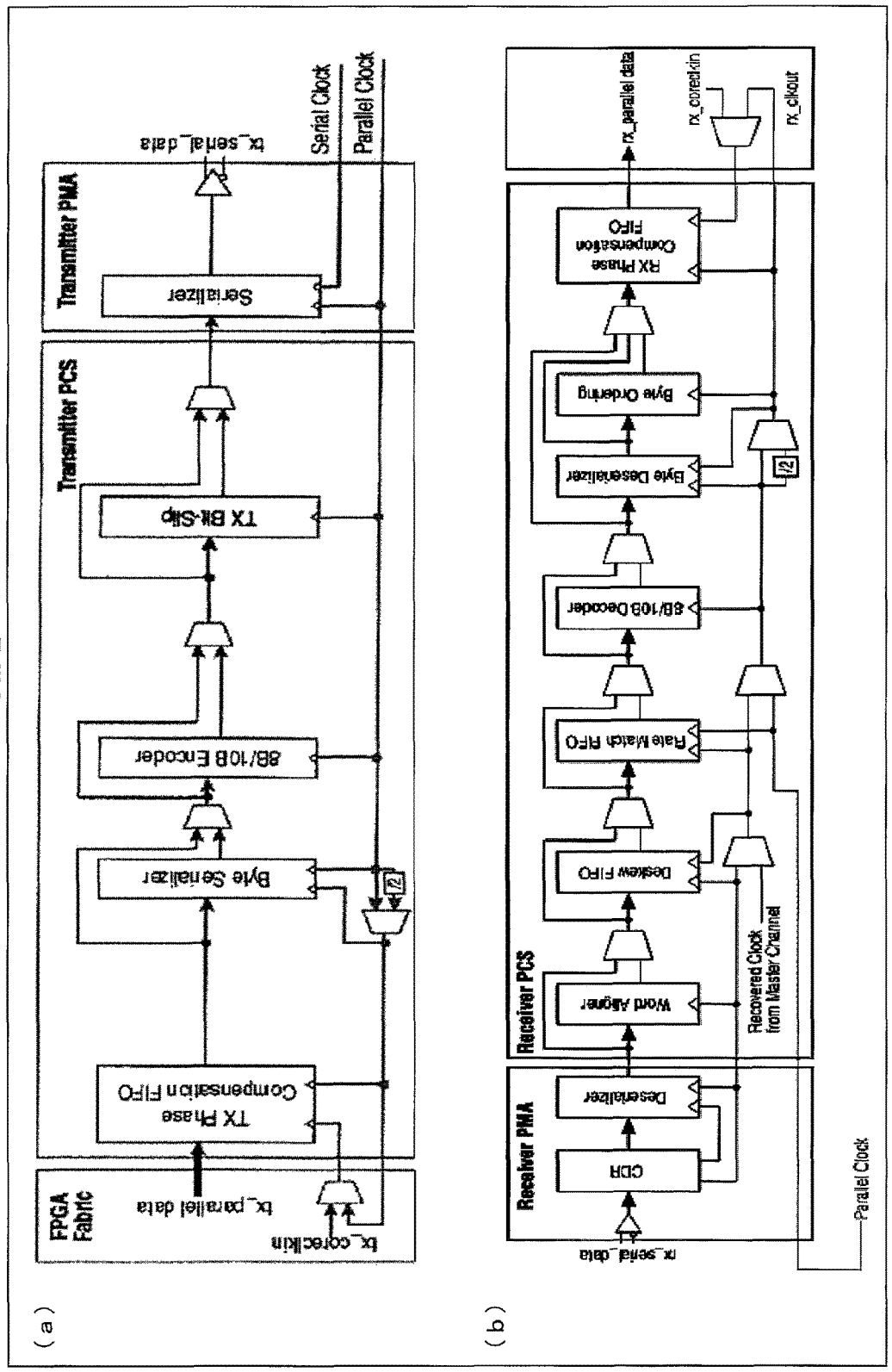

(a) of FIG. 2 is a block diagram illustrating a configuration example of a MUX provided in a camera that is included in the image transmission/reception system, and (b) of FIG. 2 is a block diagram illustrating a configuration example of a DEMUX provided in a grabber that is included in the image transmission/reception system.

Figure 3:
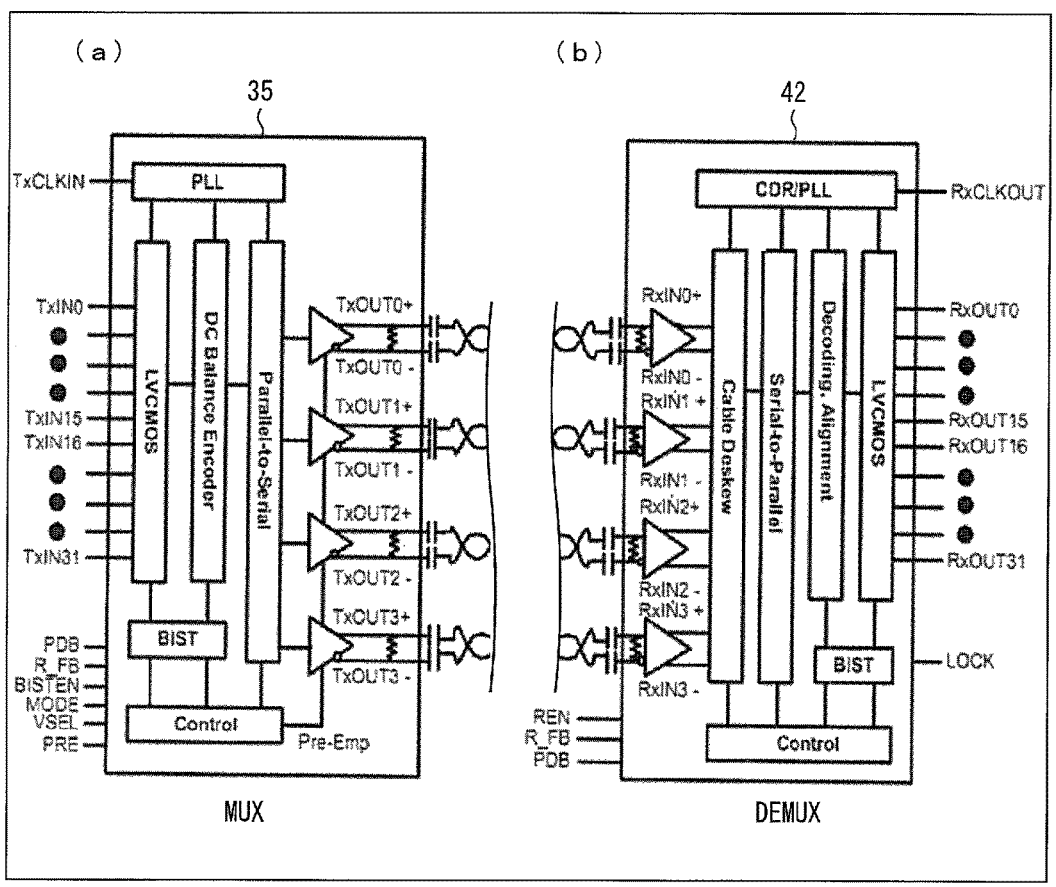

(a) of FIG. 3 is a block diagram illustrating another configuration example of the MUX provided in the camera that is included in the image transmission/reception system, and (b) of FIG. 3 is a block diagram illustrating another configuration example of the DEMUX provided in the grabber that is included in the image transmission/reception system.

Figure 4:
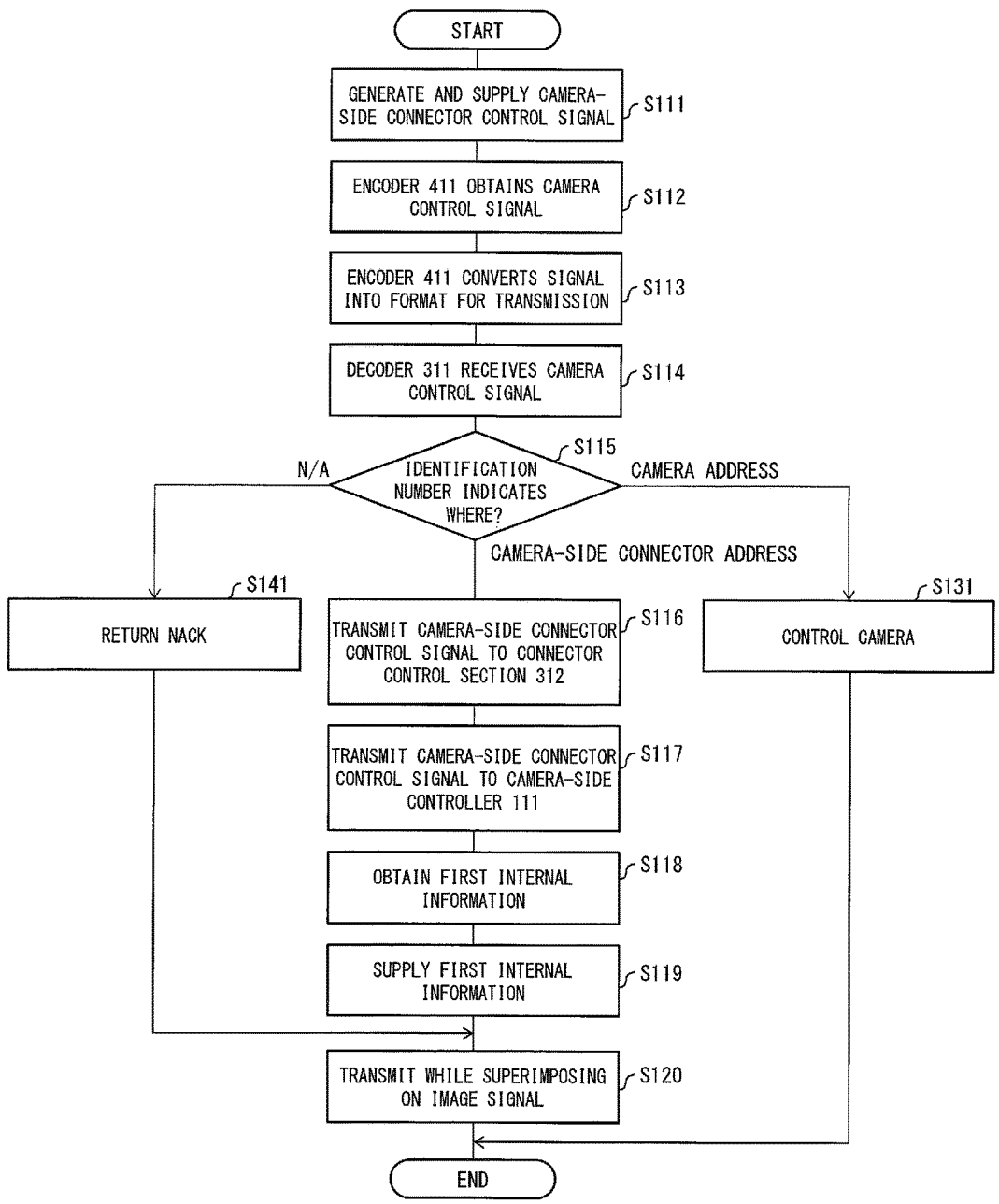

FIG. 4 is a flowchart showing a case where the grabber included in the image transmission/reception system monitors the camera-side connector.

Figure 5:
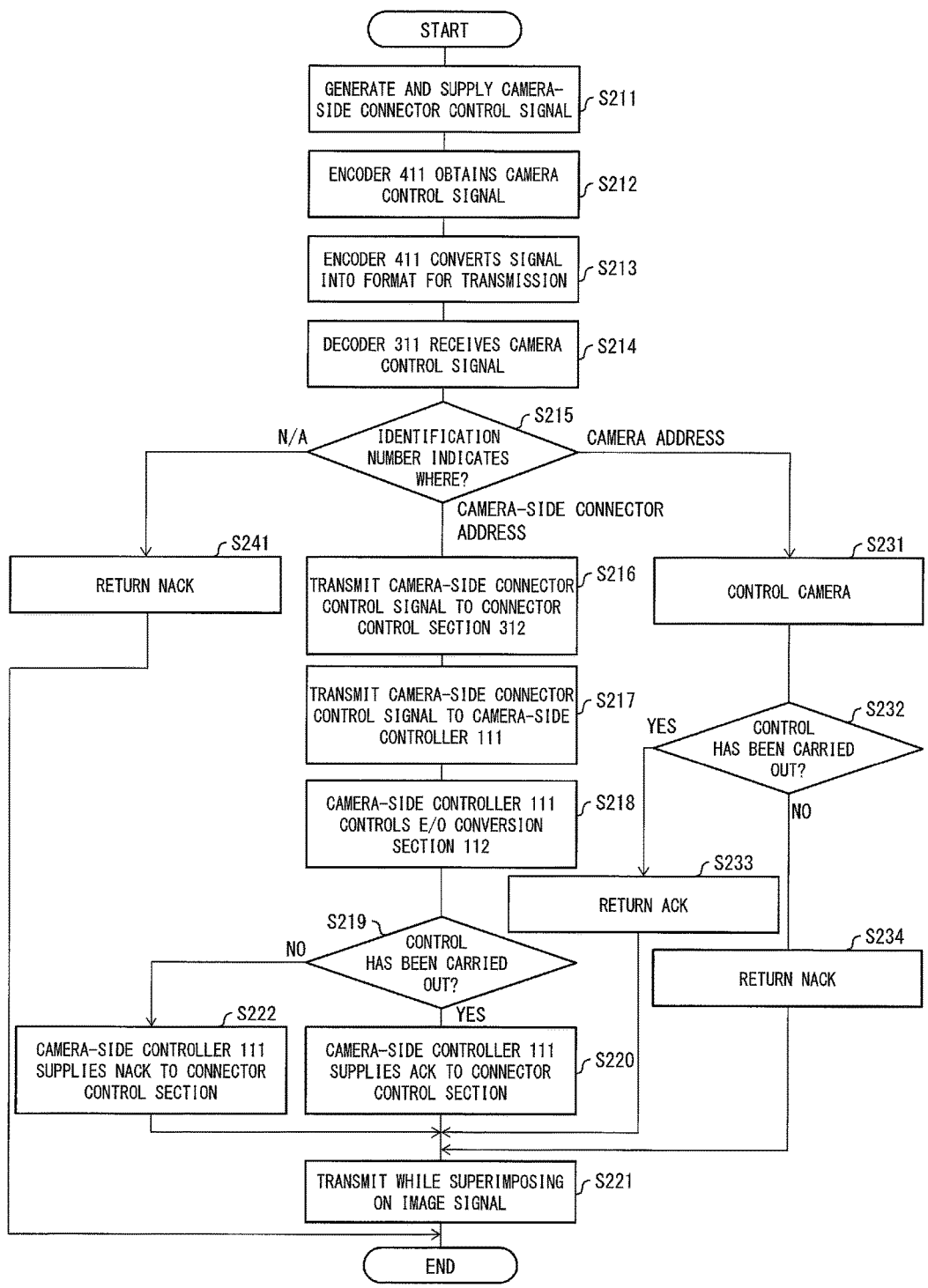

FIG. 5 is a flowchart showing a case where the grabber included in the image transmission/reception system controls the camera-side connector.

FIG. 6 is a table showing an example of a data structure of a camera control signal that is used in the image transmission/reception system.

Figure 7:
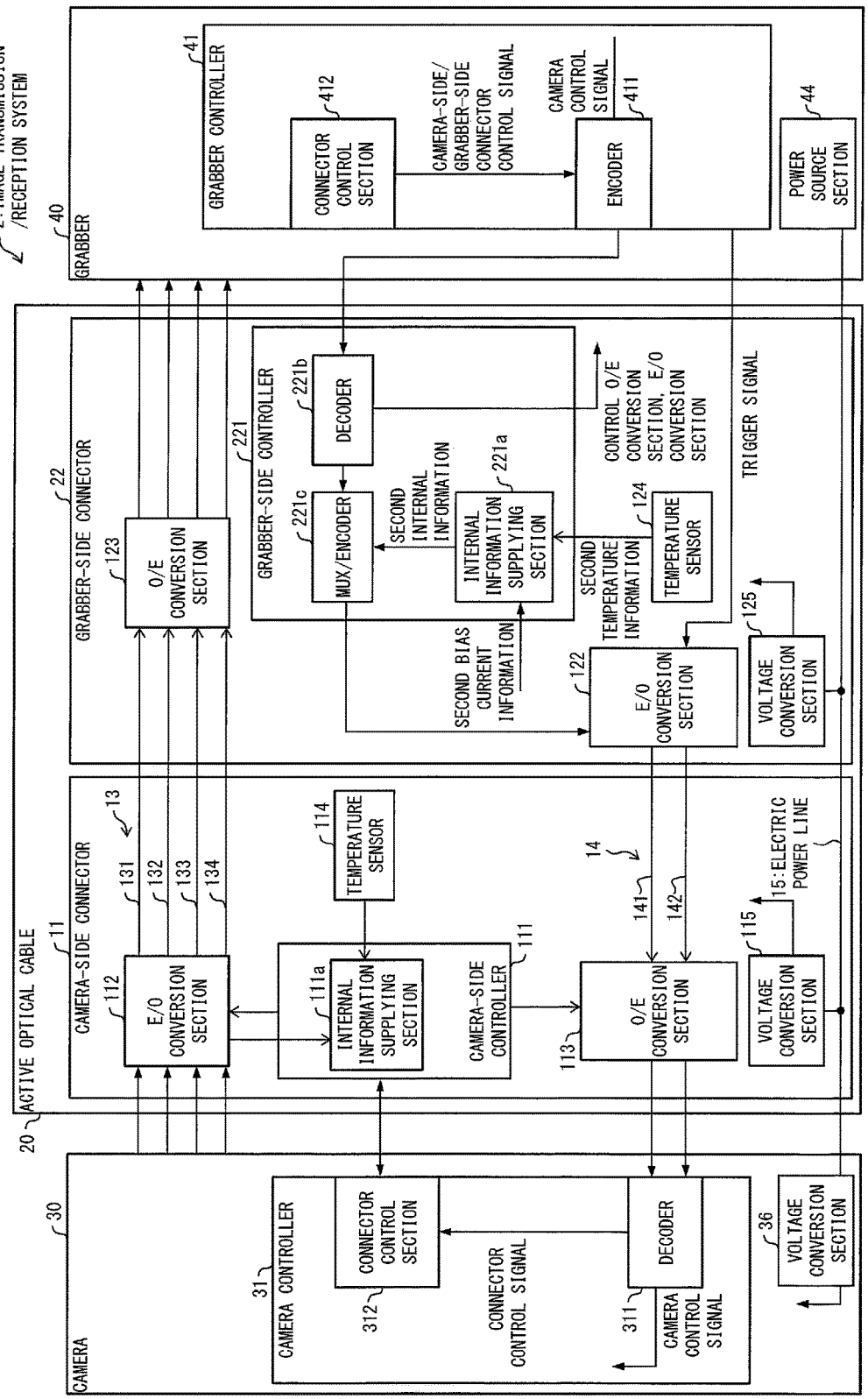

FIG. 7 is a block diagram illustrating a configuration of an image transmission/reception system in accordance with Embodiment 2 of the present invention.

Figure 8:
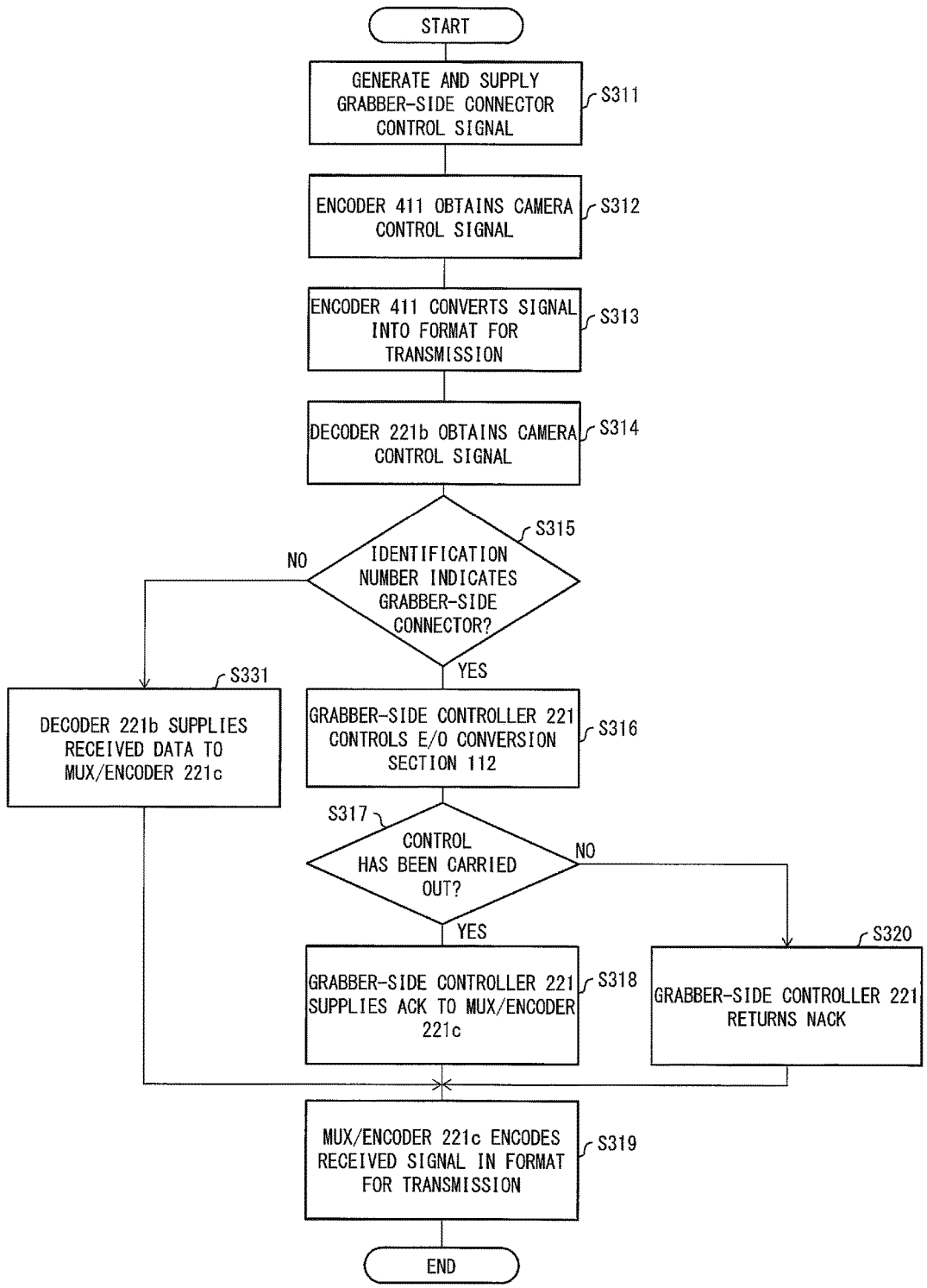

FIG. 8 is a flowchart showing a case where a grabber included in the image transmission/reception system in accordance with Embodiment 2 of the present invention controls a grabber-side connector.

Figure 9:
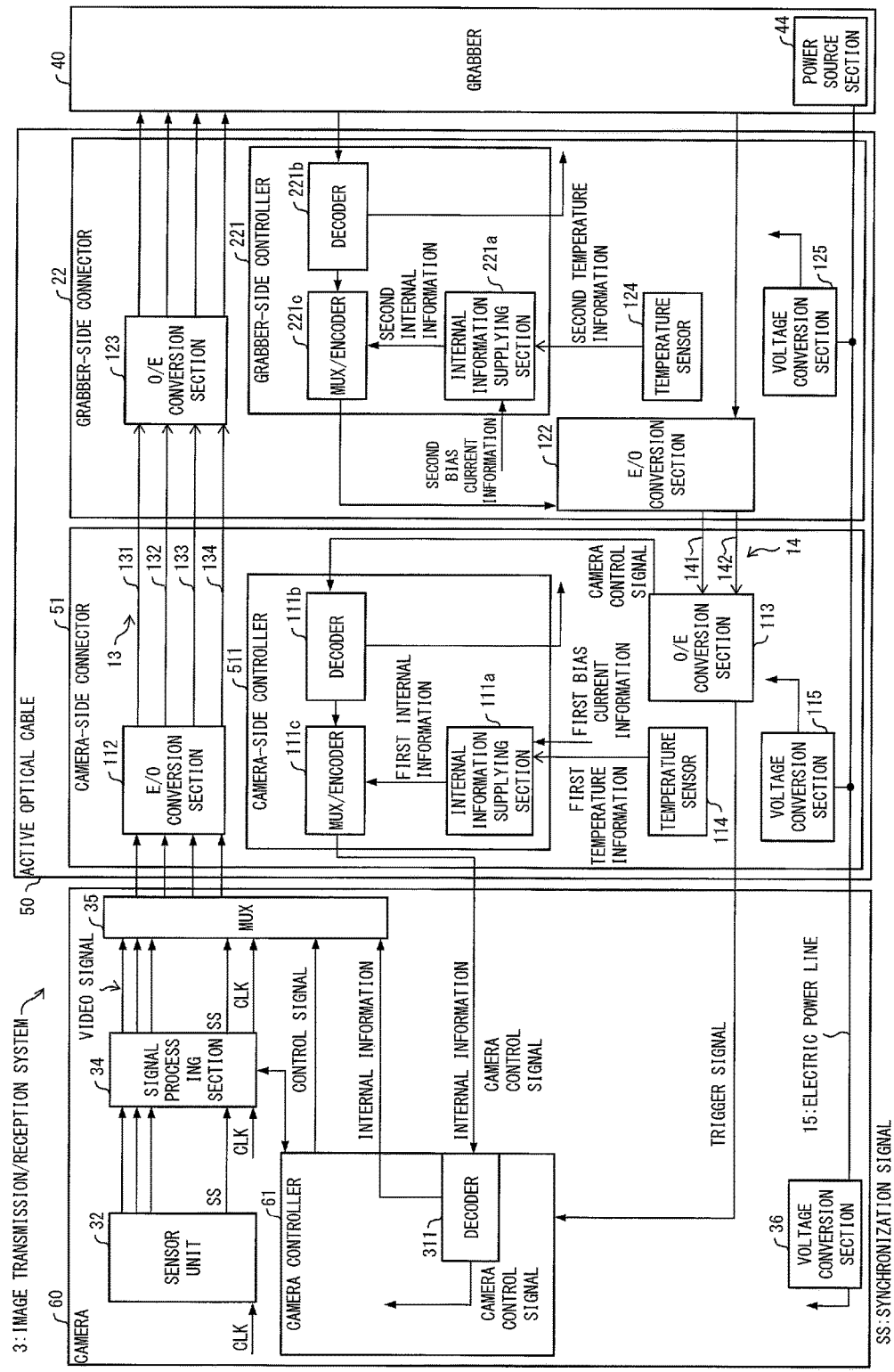

FIG. 9 is a block diagram illustrating a configuration of an image transmission/reception system in accordance with Embodiment 3 of the present invention.

Figure 10:
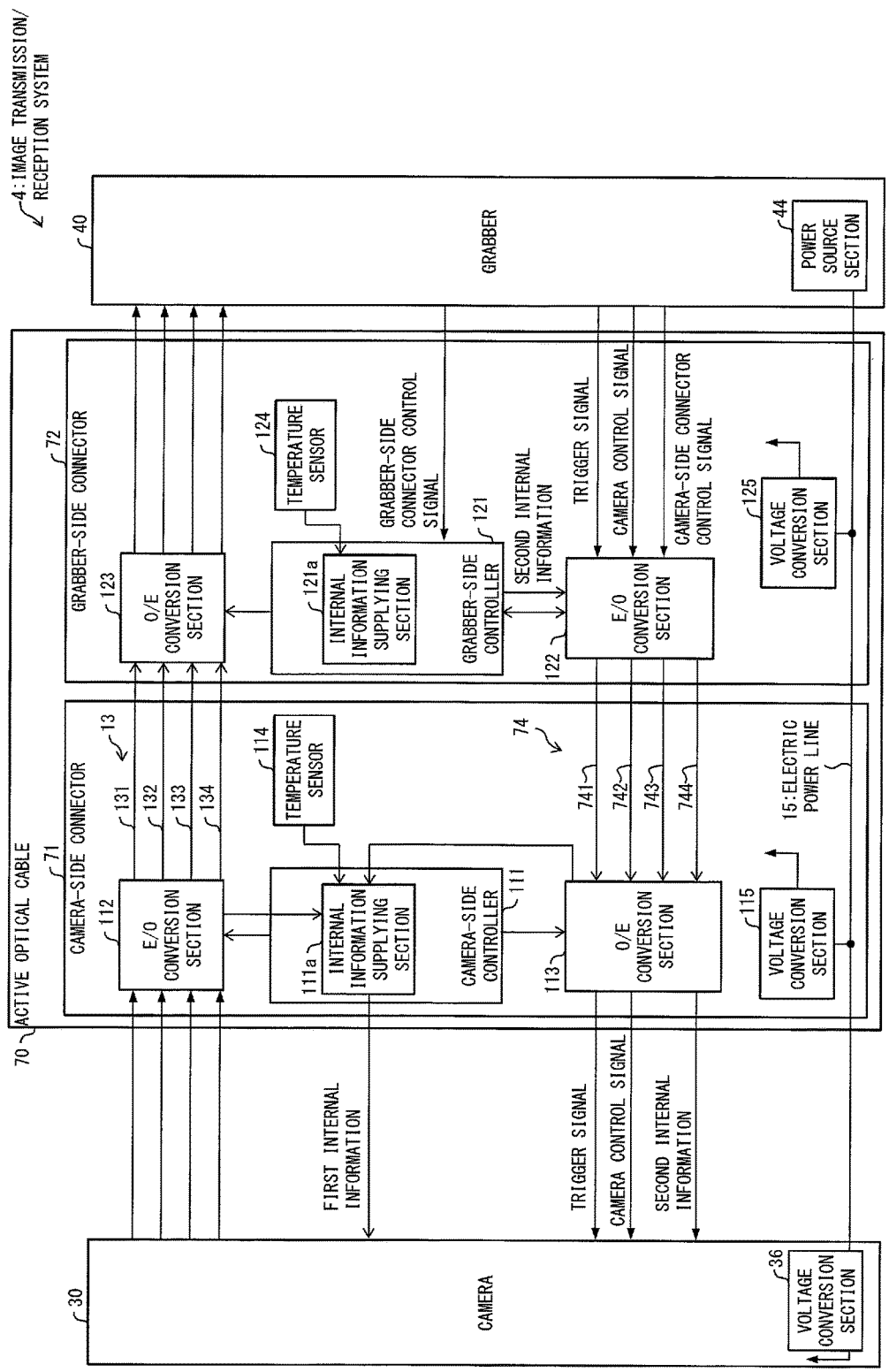

FIG. 10 is a block diagram illustrating a configuration of an image transmission/reception system in accordance with Embodiment 4 of the present invention.

Figure 11:
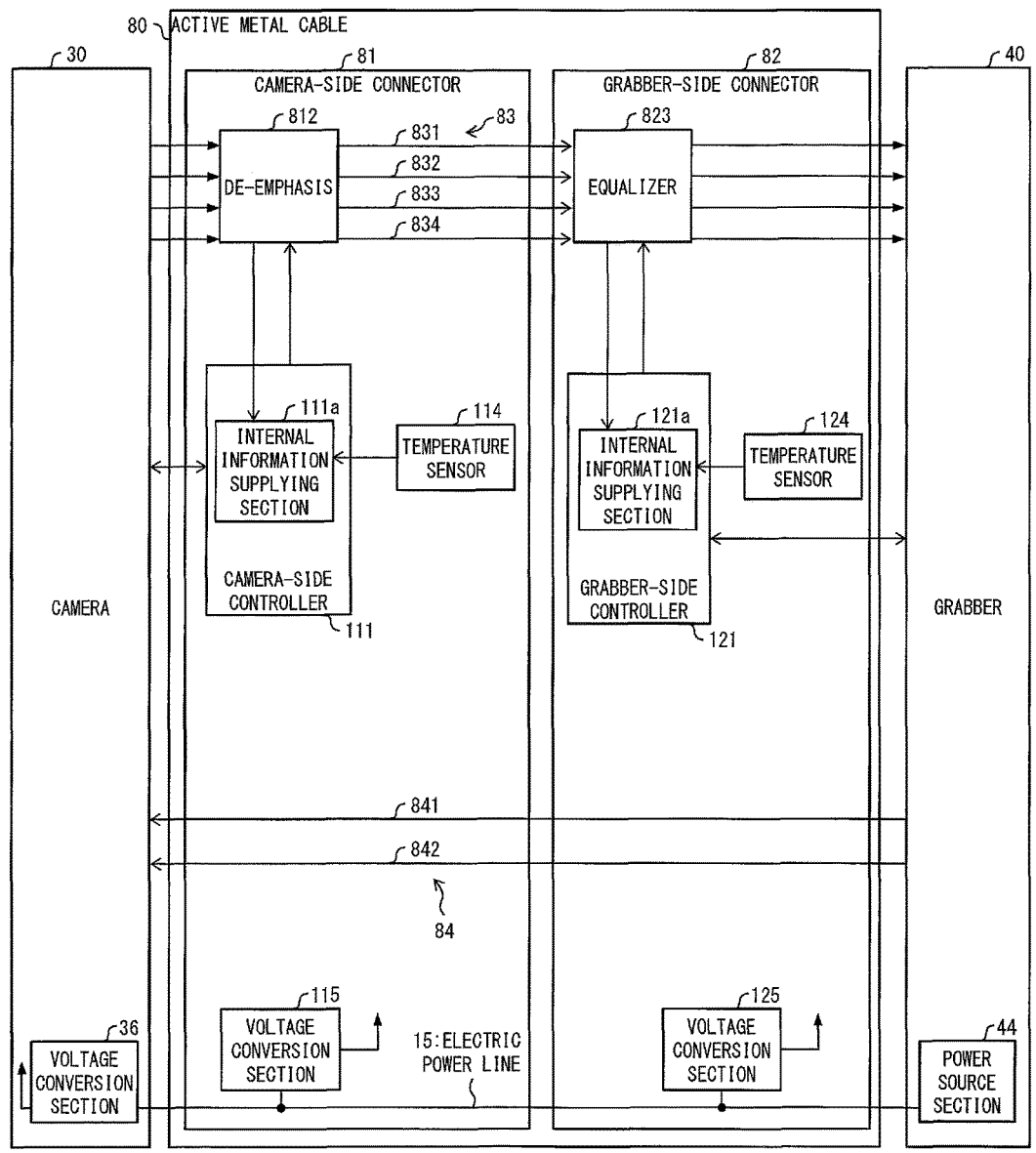

FIG. 11 is a block diagram illustrating a configuration of an image transmission/reception system in accordance with Embodiment 5 of the present invention.

Figure 12:
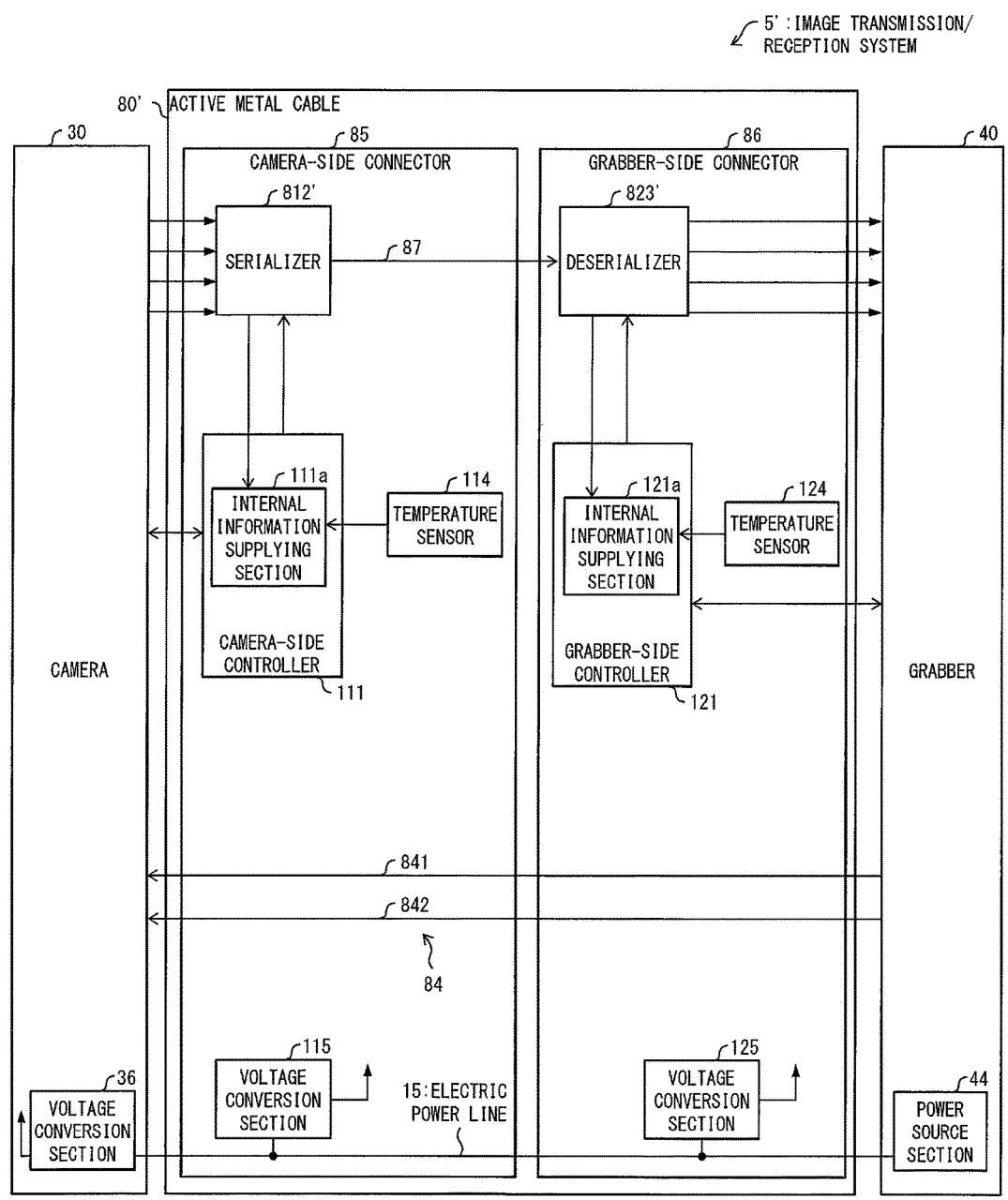

FIG. 12 is a block diagram illustrating a configuration of an image transmission/reception system in accordance with a modification example of Embodiment 5 of the present invention.

Figure 13:
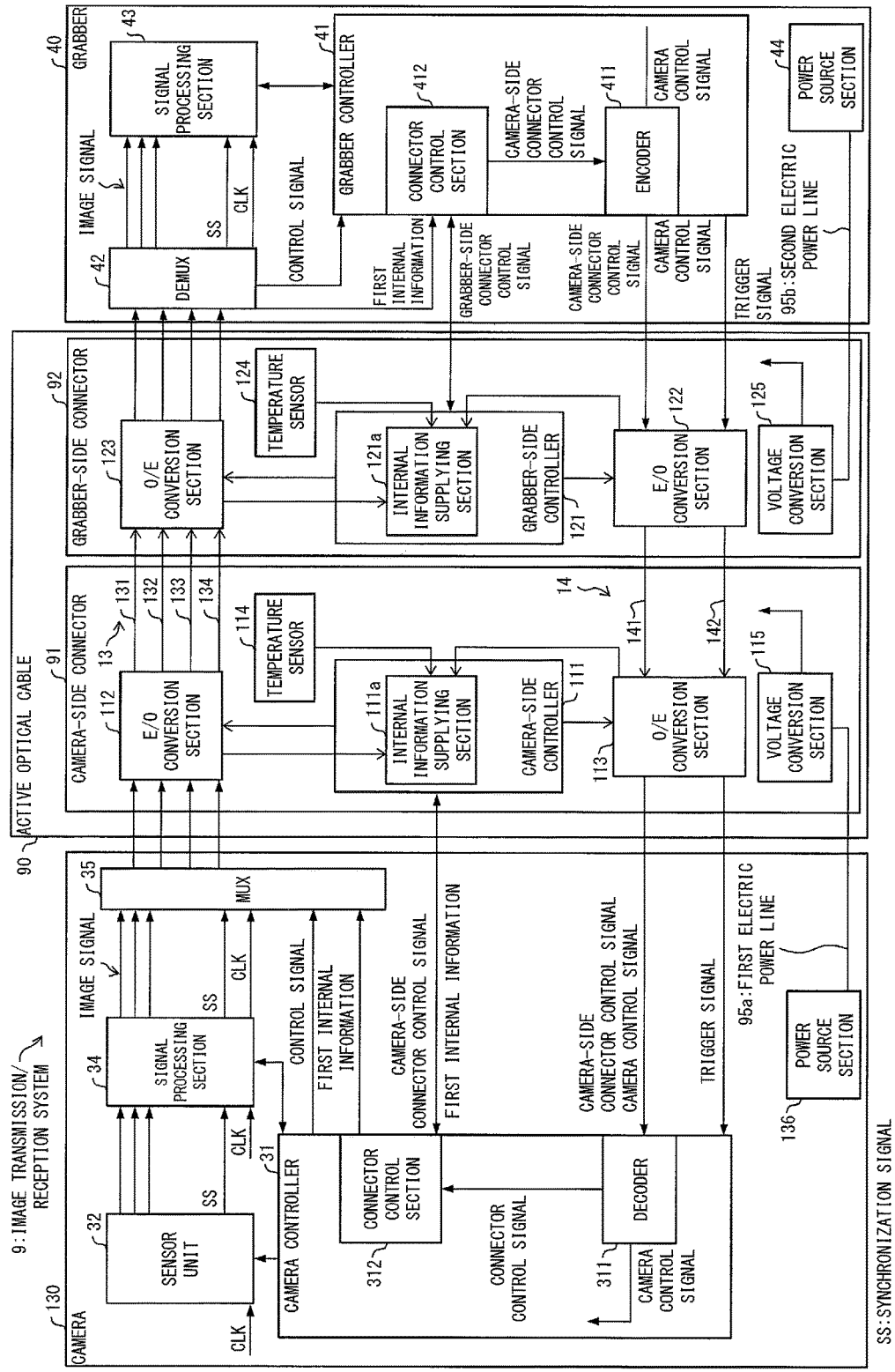

FIG. 13 is a block diagram illustrating a configuration of an image transmission/reception system in accordance with a second modification example of the present invention.

DESCRIPTION OF EMBODIMENTS

Embodiment 1

(Overview of Image Transmission/Reception System 1)

Figure 1:
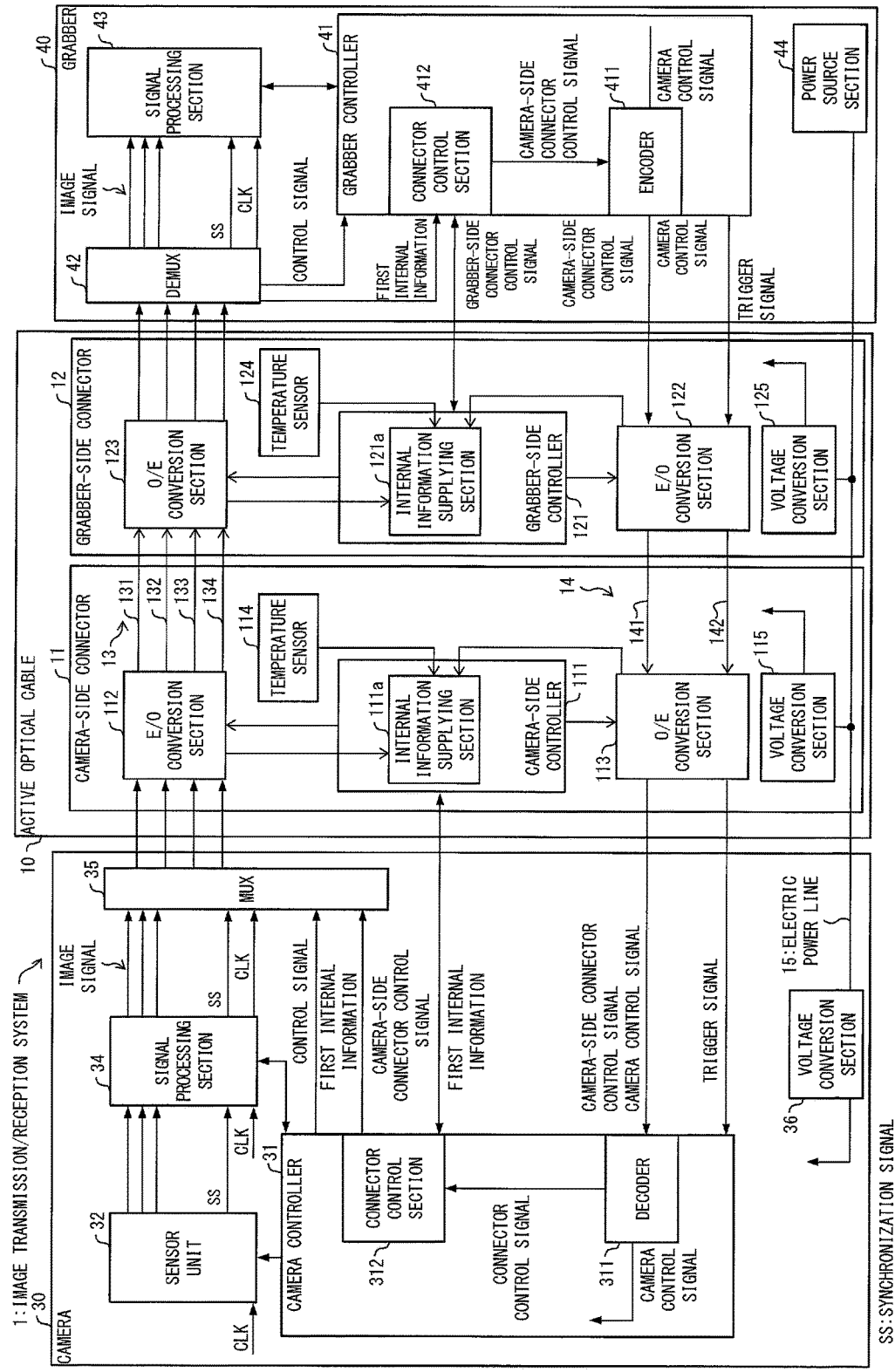
FIG. 1 is a block diagram illustrating a configuration of an image transmission/reception system in accordance with Embodiment 1 of the present invention.

The following description will discuss, with reference to FIG. 1, an image transmission/reception system 1 in accordance with Embodiment 1 of the present invention. FIG. 1 is a block diagram illustrating a configuration of the image transmission/reception system 1.

As illustrated in FIG. 1, the image transmission/reception system 1 includes an active optical cable 10 (active cable), a camera 30, and a grabber 40. In the following descriptions, the active cable means a cable which includes at least any of an element and a circuit which operate by external electric power that is externally supplied. Moreover, the element and the circuit which operate by external electric power are collectively referred to as "active element". Examples of the active element encompass a parallel/serial (P/S) conversion section, a serial/parallel (S/P) conversion section, an electrical/optical (E/O) conversion section, an optical/electrical (O/E) conversion section, a serializer, a deserializer, and the like.

The active optical cable (AOC) is an active cable in which a signal line for transmitting at least a high-speed signal (e.g., image signal) is configured by an optical fiber. In contrast to the active optical cable, a cable in which a signal line for transmitting a high-speed signal (e.g., an image signal) is configured by a metal wire is called "active metal cable".

The camera 30 serves as an image pickup device for taking a still image or a moving image and as an image transmission device for transmitting, via the active optical cable, an image signal which is indicative of the still image or the moving image thus taken.

The grabber 40 serves as an image reception device for receiving an image signal which has been transmitted from the camera 30 via the active optical cable 10 and as an image input interface board for inputting the received image signal to a computer on which the grabber 40 is mounted. The computer, on which the grabber 40 connected with the camera 30 via the active optical cable 10 is mounted, serves as an image processing device.

In the following descriptions, a transmission direction from the camera 30 to the grabber 40 via the active optical cable 10 is defined as a downstream direction, and a transmission direction from the grabber 40 to the camera 30 via the active optical cable 10 is defined as an upstream direction.

First, the following description will discuss basic configurations of the camera 30, the active optical cable 10, and the grabber 40 in the image transmission/reception system 1. Then, configurations for monitoring and controlling a camera-side connector 11 (transmission-side connector) and a grabber-side connector 12 (reception-side connector) in the active optical cable 10 will be described.

(Camera 30)

As illustrated in FIG. 1, the camera 30 includes a camera controller 31, a sensor unit 32, a signal processing section 34, a time division multiplexing circuit (MUX) 35, and a voltage conversion section 36.

The camera controller 31 controls components in the camera 30 and is specifically a micro controller (micro controller unit (MCU)). The camera controller 31 controls a shutter timing of a shutter (not illustrated) in accordance with a trigger signal obtained from an O/E conversion section 113 included in the camera-side connector 11. Note that the camera controller 31 can be configured by, for example, a field programmable gate array (FPGA) instead of the MCU.

The camera controller 31 includes a decoder 311 and a connector control section 312 as functional blocks. The decoder 311 decodes a camera control signal (image transmission device control signal) which has been obtained from the O/E conversion section 113 of the camera-side connector 11 and supplies the decoded camera control signal to the camera controller 31. The camera controller 31 controls the sensor unit 32, the signal processing section 34, and the MUX 35 in accordance with the decoded camera control signal.

The camera control signal obtained from the O/E conversion section 113 contains (i) a camera-side connector control signal with which the grabber 40 controls an active element (in particular, the E/O conversion section 112) in the camera-side connector 11 and (ii) a camera-side connector monitor signal with which the grabber 40 monitors an internal state of the camera-side connector 11. The decoder 311 decodes the camera control signal as above described and also separates the camera-side connector control signal and the camera-side connector monitor signal, which have been superimposed on the camera control signal, from the camera control signal. Details of the camera-side connector control signal and the camera-side connector monitor signal will be described later together with the internal information of the camera-side connector 11. Note that, in a case where it is unnecessary to distinguish the camera-side connector control signal and the camera-side connector monitor signal from each other, those signals are collectively referred to as "camera-side connector control signal". Operations of the connector control section 312 will also be described later together with the internal information of the camera-side connector 11.

The sensor unit 32 includes an image pickup sensor (not illustrated), an A/D conversion section (not illustrated), a synchronization signal generating section (not illustrated), and an analog image processing section (not illustrated). The image pickup sensor includes a plurality of pixels which are arranged in a matrix manner. In each of the plurality of pixels of the image pickup sensor, an intensity of light received is converted into a voltage corresponding to the intensity of light. With the configuration, the image pickup sensor takes, as an image, light which has entered via an optical system (not illustrated), converts the image into an analog image signal indicative of the image, and supplies the analog image signal to the A/D conversion section. The image pickup sensor can be a color image pickup sensor which can detect respective intensities of red (R) light, green (G) light, and blue (B) light, or can be a monochrome image pickup sensor. In the following descriptions, the image pickup sensor is assumed to be a color image pickup sensor.

The A/D conversion section converts an analog image signal, which has been obtained from the image pickup sensor, into a digital image signal containing 8 bits of R, 8 bits of G, and 8 bits of B, that is, 24 bits in total. Here, each of the image signals of R, G, and B which is an 8-bit signal constitutes one (1) parallel signal sequence. Therefore, the image signal of 24 bits in total constitutes three parallel signal sequences. In a case where the A/D conversion section converts an aspect of the image signal from analog to digital, the A/D conversion section uses a clock (CLK) which is supplied from a clock generator (not illustrated). In the following descriptions, an "image signal" that is not specified as an "analog image signal" means a digital image signal. The A/D conversion section supplies the digital image signal, which has been subjected to A/D conversion, to the signal processing section 34. In this case, the number of bits of each of the image signals of R, G, and B is assumed to be 8 bits. Note, however, that the number of bits of each of the image signals of R, G, and B is not limited to 8 bits and can be, for example, 10 bits or 12 bits. Therefore, the total number of bits of the image signals of R, G, and B can be more than 24 bits.

The analog image processing section carries out, as appropriate, analog image processing such as analog gain, analog offset, and analog filter with respect to an analog image signal which has been supplied from the image pickup sensor. The analog image processing section supplies the analog image signal, which has been subjected to the analog image processing as appropriate, to the A/D conversion section. That is, the analog image processing which is carried out by the analog image processing section is not essential processes in the camera 30.

The synchronization signal generating section generates synchronization signals each of which is synchronized with the digital image signal which has been converted by the A/D conversion section and which respectively indicate vertical synchronization, horizontal synchronization, and effective data. The number of bits of each of the synchronization signals, which respectively indicate vertical synchronization, horizontal synchronization, and effective data is 1 bit.

The signal processing section 34 carries out digital image processing such as digital gain, digital offset, and digital filter with respect to a digital image signal, which has been obtained from the A/D conversion section and includes three parallel signal sequences, with use of a clock CLK supplied from the clock generator (not illustrated) and three synchronization signals (indicating vertical synchronization, horizontal synchronization, and effective data) obtained from the synchronization signal generating section. That is, the digital image processing carried out by the signal processing section 34 is not essential processes in the camera 30. The signal processing section 34 supplies, to the MUX 35, the 24-bit image signal which has been subjected to the digital image processing as appropriate, the three synchronization signals (indicating vertical synchronization, horizontal synchronization, and effective data), and the clock CLK.

The MUX 35 carries out, with use of the clock CLK, time-division multiplexing with respect to the image signal including the three parallel signal sequences and to the synchronization signals which have been obtained from the signal processing section 34, and thus generates four pairs of differential signals. The MUX 35 can be configured by, for example, a commercially available FPGA. (a) of FIG. 2 is a block diagram of the MUX 35 which is configured by a FPGA which is Cyclone V manufactured by Altera Corporation. The block diagram of (a) of FIG. 2 illustrates a time-division multiplexing block of one (1) lane for generating a pair of serial signals by carrying out time-division multiplexing with respect to 8-bit parallel signals. As illustrated in (a) of FIG. 2, in the time-division multiplexing block, the 8-bit parallel signals are encoded with a method called 8B/10B encoding, and then the serializer carries out time-division multiplexing with respect to the parallel signals, which have been encoded, and thus a pair of serial signals is generated.

The MUX 35 deals with at least a 24-bit image signal and 3-bit synchronization signals, and therefore the MUX 35 merely needs to include four lanes of the time-division multiplexing blocks illustrated in FIG. 2. In a case where the MUX 35 includes four lanes of the time-division multiplexing blocks, it is possible to carry out time-division multiplexing of a maximum of 32-bit data, and it is therefore possible to carry out time-division multiplexing of data other than the image signal and the synchronization signals, together with the image signal and the synchronization signals.

Alternatively, the MUX 35 can be configured by a commercially available integrated circuit (IC). In Embodiment 1, the MUX 35 is configured by DS92LV3241 which is a serializer IC manufactured by Texas Instruments Incorporated (see (a) of FIG. 3). (b) of FIG. 3 illustrates DS92LV3242 which is a deserializer IC serving as a DEMUX 42 which will be described later.

As illustrated in FIG. 3, the MUX 35 can generate four pairs of differential signals (+ and − of TxOUT0, + and − of TxOUT1, + and − of TxOUT2, and + and − of TxOUT3) by carrying out time-division multiplexing with respect to a maximum of 32-bit parallel signals (TxIN0 through TxIN31) which have been obtained. The DEMUX 42 will be described later together with the grabber 40.

The MUX 35 supplies the four pairs of differential signals (hereinafter, referred to as first through fourth image signals)

which have been generated by time-division multiplexing to the E/O conversion section 112 of the camera-side connector 11.

(Active Optical Cable 10)

As illustrated in FIG. 1, the active optical cable 10 includes a camera-side connector 11, a grabber-side connector 12, a downstream optical fiber 13, an upstream optical fiber 14, and an electric power line 15.

The camera-side connector 11 is provided at one end of the active optical cable 10 and is connected with the camera 30. The grabber-side connector 12 is provided at the other end of the active optical cable 10 and is connected with the grabber 40.

The downstream optical fiber 13 is a signal line for transmitting the image signals, which are four pairs of differential signals supplied from the camera 30, to the grabber 40 and includes four optical fibers 131 through 134.

The upstream optical fiber 14 includes an optical fiber 141 for transmitting a camera control signal for controlling the camera and an optical fiber 142 for transmitting a trigger signal for instructing the camera on a shutter timing. Note that, in a case where the technique of a QSFP active optical cable in which four upstream optical fibers and four downstream optical fibers are combined is applied to the active optical cable 10, the active optical cable 10 can transmit a camera control signal and a trigger signal with use of two light emitting sections which correspond to the respective optical fibers 141 and 142 among four light emitting sections included in the E/O conversion section 122. In other words, it is possible to employ a configuration in which two light emitting sections among the four light emitting sections are set to be disabled, and two optical fibers which correspond to the respective two disabled light emitting sections are not used. The image signal, the camera control signal, and the trigger signal will be described later. Here, setting a light emitting section to be disabled means to set an electric current, which is to be supplied to the light emitting section (e.g., laser element), to be equal to or lower than a threshold electric current of the light emitting element (e.g., 0 mA). Note that, in Embodiment 1, a configuration is employed in which two signals (camera control signal and trigger signal) are transmitted through the upstream optical fiber 14. Therefore, two light emitting sections among the four light emitting sections included in the E/O conversion section 122 are set to be disabled. However, depending on the number of signals which is to be transmitted through the upstream optical fiber 14, the number of light emitting sections to be disabled can be any of 1 or more and 3 or less. According to the configuration, it is possible to reduce power consumption by the grabber-side connector 12, as compared with a case where no light emitting section is set to be disabled.

Note that, in a case where a technique of a CXP (C=hex character for 12; XP=eXtended capability Pluggable) active optical cable in which 12 upstream optical fibers and 12 downstream optical fibers are combined is applied to the active optical cable 10, it is possible to employ a configuration in which 10 pieces ((N−M) pieces) of light emitting sections among 12 pieces (N=12) of light emitting sections included in the E/O conversion section 122 are set to be disabled, and 10 optical fibers corresponding to the disabled 10 pieces of light emitting sections are not used.

The electric power line 15 is a metal wire through which electric power is supplied from a power source section 44 of the grabber 40 to the grabber-side connector 12, the camera-side connector 11, and the camera 30. Through the electric power line 15, a predetermined voltage (e.g., direct current of 12 V) of electric power is supplied from the power source section 44 which is a constant-voltage source.

The camera-side connector 11 includes a camera-side controller 111, an electrical/optical conversion section (E/O conversion section) 112, an optical/electrical conversion section (O/E conversion section) 113, a temperature sensor 114, and a voltage conversion section 115.

The voltage conversion section 115 converts a voltage of electric power supplied through the electric power line 15 into a predetermined voltage (e.g., direct current voltage of 3.3 V), and then supplies the electric power, whose voltage has been converted, to the camera-side controller 111, the E/O conversion section 112, the O/E conversion section 113, and the temperature sensor 114. The camera-side controller 111, the E/O conversion section 112, the O/E conversion section 113, and the temperature sensor 114 which are active elements are driven by electric power supplied from the voltage conversion section 115.

The camera-side controller 111 controls the E/O conversion section 112 and the O/E conversion section 113, and is specifically a MCU. An internal information supplying section 111a included in the camera-side controller 111 supplies, to the camera 30, internal information which is indicative of an internal state in relation to an operating state of the camera-side connector 11. Note that the internal information will be described later.

The E/O conversion section 112 includes a laser driving section (not illustrated) and a laser element (not illustrated) which is a light emitting section. The E/O conversion section 112 converts an image signal which is an electric signal supplied from the MUX 35 of the camera 30 into an image signal which is an optical signal. Then, the E/O conversion section 112 couples the image signal, which has been converted into the optical signal, with the downstream optical fiber 13. Note that the laser element in the E/O conversion section 112 can be, for example, a laser element which is called vertical cavity surface emitting laser (VCSEL).

Specifically, the E/O conversion section 112 obtains, from the MUX 35, image signals (first through fourth image signals) which are four pairs of differential signals. For example, in a case of the first image signal, the laser driving section of the E/O conversion section 112 supplies, in accordance with a control signal obtained from the camera-side controller 111, an electric current signal which is based on a predetermined bias current and a predetermined modulated current to the laser element. The laser element emits, to the optical fiber 131, laser light (i.e., the first image signal which is an optical signal) whose light emission intensity has been modulated based on an electric current signal obtained from the laser driving section. Through those processes, the E/O conversion section 112 converts an aspect of the first image signal from the electric signal to the optical signal.

Similarly, the E/O conversion section 112 (i) converts an aspect of the second image signal from the electric signal to the optical signal and then couples the second image signal with the optical fiber 132, (ii) converts an aspect of the third image signal from the electric signal to the optical signal and then couples the third image signal with the optical fiber 133, and converts an aspect of the fourth image signal from the electric signal to the optical signal and then couples the fourth image signal with the optical fiber 134.

Moreover, the E/O conversion section 112 supplies a bias current in driving the laser element to the internal information supplying section 111a of the camera-side controller 111. The bias current is one of pieces of the internal information which are indicative of an internal state of the camera-side connector 11. A method for transmitting the internal information of the camera-side connector 11 to the grabber 40 will be described later.

Meanwhile, the O/E conversion section 113 includes a light receiving section (not illustrated) and a current/voltage conversion section (not illustrated). The O/E conversion section 113 converts an aspect of a camera control signal, which has been transmitted through the upstream optical fiber 14, from an optical signal to an electric signal, and converts an aspect of a trigger signal, which has been transmitted through the upstream optical fiber 14, from an optical signal to an electric signal. Then, the O/E conversion section 113 supplies, to the camera controller 31 of the camera 30, the camera control signal and the trigger signal which have been converted to the electric signals. Note that the light receiving section of the O/E conversion section 113 can be, for example, PIN-type photodiode (PIN-PD) which is made of GaAs.

Specifically, the light receiving section of the O/E conversion section 113 receives, via the optical fiber 141, the camera control signal which is the optical signal. The photodiode which is the light receiving section converts a light intensity of the optical signal, which represents the camera control signal thus received, to a corresponding photodiode electric current. The photodiode supplies, to the current/voltage conversion section, the photodiode electric current thus converted. The current/voltage conversion section converts the photodiode electric current, which has been obtained from the photodiode that is the light receiving section, to a corresponding voltage. The current/voltage conversion section supplies the voltage corresponding to the photodiode electric current, that is, an electric signal to the camera controller 31. Through those processes, the O/E conversion section 113 converts an aspect of the camera control signal from the optical signal to the electric signal.

Similarly, the O/E conversion section 113 converts an aspect of the trigger signal from an optical signal to an electric signal, and then supplies the trigger signal to the camera controller 31.

The temperature sensor 114 is provided in a vicinity of the laser element of the E/O conversion section 112 and detects a temperature in the vicinity of the laser element. The temperature sensor 114 supplies the temperature detected in the vicinity of the laser element to the internal information supplying section 111*a*. The temperature in the vicinity of the laser element is one of pieces of the internal information which are indicative of an internal state of the camera-side connector 11. A method for transmitting the internal information of the camera-side connector 11 to the grabber 40 will be described later.

The following description will discuss the grabber-side connector 12. The grabber-side connector 12 includes a grabber-side controller 121, an E/O conversion section 122, an O/E conversion section 123, a temperature sensor 124, and a voltage conversion section 125.

The voltage conversion section 125 converts a voltage of electric power supplied through the electric power line 15 into a predetermined voltage (e.g., direct current voltage of 3.3 V), and then supplies the electric power, whose voltage has been converted, to the grabber-side controller 121, the E/O conversion section 122, the O/E conversion section 123, and the temperature sensor 124. The grabber-side controller 121, the E/O conversion section 122, the O/E conversion section 123, and the temperature sensor 124 which are active elements are driven by electric power supplied from the voltage conversion section 125.

The grabber-side controller 121 controls components in the grabber-side connector 12 and is specifically a MCU.

The E/O conversion section 122 includes a laser driving section (not illustrated) and a laser element (not illustrated) and is configured in a manner similar to the E/O conversion section 112 of the camera-side connector 11. The E/O conversion section 112 converts an aspect of an image signal, which has been obtained from the MUX 35, from an electric signal to an optical signal, whereas the E/O conversion section 122 converts an aspect of a camera control signal and a trigger signal, which have been obtained from a grabber controller 41 of the grabber 40, from an electric signal to an optical signal.

For example, in a case of the camera control signal obtained from the grabber controller 41, the laser driving section of the E/O conversion section 122 supplies, in accordance with a control signal obtained from the grabber-side controller 121, an electric current signal which is based on a predetermined bias current and a predetermined modulated current to the laser element. The laser element couples, with the optical fiber 141, laser light (i.e., the camera control signal which is an optical signal) whose light emission intensity has been modulated based on an electric current signal obtained from the laser driving section. Through those processes, the E/O conversion section 122 converts an aspect of the camera control signal from the electric signal to the optical signal.

Similarly, the E/O conversion section 122 converts an aspect of the trigger signal from the electric signal to the optical signal and then couples the trigger signal with the optical fiber 142.

Moreover, the E/O conversion section 122 supplies a bias current in driving the laser element to the grabber-side controller 121. The bias current is one of pieces of the internal information which are indicative of an internal state of the grabber-side connector 12. A method for transmitting the internal information of the grabber-side connector 12 to the grabber 40 will be described later.

Meanwhile, the O/E conversion section 123 includes a light receiving section (not illustrated) and a current/voltage conversion section (not illustrated), and is configured in a manner similar to the O/E conversion section 113 of the camera-side connector 11. The O/E conversion section 113 converts an aspect of the camera control signal and the trigger signal, which have been transmitted through the upstream optical fiber 14, from the optical signal to the electric signal, whereas the E/O conversion section 123 converts an aspect of first through fourth image signals, which have been transmitted through the downstream optical fiber 14, from the optical signals to electric signals which are four pairs of differential signals.

Specifically, the light receiving section of the O/E conversion section 123 receives, via the optical fiber 131, the first image signal which is an optical signal. A photodiode which is the light receiving section converts an intensity of the optical signal, which represents the first image signal thus received, to a corresponding photodiode electric current and supplies the photodiode electric current to the current/voltage conversion section. The current/voltage conversion section converts the photodiode electric current, which has been obtained from the photodiode, to a corresponding voltage. The current/voltage conversion section supplies the voltage corresponding to the photodiode electric current to the DEMUX 42 of the grabber 40 as the first image signal which is an electric signal. More specifically, the current/voltage conversion section converts the photodiode electric current to a pair of differential signals corresponding to the voltage corresponding to the photodiode electric current, and supplies the pair of differential signals to the DEMUX 42 as the first image signal. Through those processes, the O/E conversion section 123 converts an aspect of the first image signal from the optical signal to the electric signal.

Similarly, the O/E conversion section 123 (i) converts an aspect of the second image signal from the optical signal to an electric signal which is a pair of differential signals, (ii) converts an aspect of the third image signal from the optical signal to an electric signal which is a pair of differential signals, and (iii) converts an aspect of the fourth image signal from the optical signal to an electric signal which is a pair of differential signals. The O/E conversion section 123 supplies, to the DEMUX 42, the second through fourth image signals together with the first image signal.

The temperature sensor 124 is provided in a vicinity of the laser element of the E/O conversion section 122 and detects a temperature in the vicinity of the laser element. The temperature sensor 124 supplies the temperature detected in the vicinity of the laser element to the internal information supplying section 121a. The temperature in the vicinity of the laser element is one of pieces of the internal information which are indicative of an internal state of the grabber-side connector 12. A method for transmitting the internal information of the grabber-side connector 12 to the grabber 40 will be described later.

(Grabber 40)

As illustrated in FIG. 1, the grabber 40 includes a grabber controller 41, a demultiplexing circuit (DEMUX) 42, a signal processing section 43, and a power source section 44.

The grabber controller 41 controls the components in the grabber 40 and is specifically a micro controller. The grabber controller 41 controls the DEMUX 42, the signal processing section 43, and the power source section 44 in accordance with control signals supplied from a computer which is the image processing device.

The grabber controller 41 includes an encoder 411 and a connector control section 412 as functional blocks. The encoder 411 encodes a camera control signal, which is to be transmitted to the camera 30, in a data transmission format, and supplies the camera control signal to the E/O conversion section 122 of the grabber-side connector 12. Here, the data transmission format means a format in an aspect suitable for transmission, as compared with a format which is used when the computer that is the image processing device processes the camera control signal. Concrete examples of the data transmission format encompass a format defined by RS-232C (EIA-232 standard) and a format using a coded mark inversion (CMI) coding scheme.

Moreover, the grabber controller 41 supplies a trigger signal to the E/O conversion section 122. The trigger signal includes a signal which serves as a trigger to control a shutter timing at which the camera 30 takes an image. The trigger signal which is supplied by the grabber controller 41 is a real time signal which is not time-division multiplexed.

The DEMUX 42 obtains four image signals (first through fourth image signals) from the O/E conversion section 123 of the grabber-side connector 12. The DEMUX 42 separates each of the first through fourth image signals which are respective four pairs of differential signals in a time division manner, and thus restores (i) an image signal including three parallel signal sequences and (ii) the synchronization signals.

The DEMUX 42 can be configured by, for example, a commercially available FPGA. (b) of FIG. 2 is a block diagram illustrating the DEMUX 42 which is configured, as the FPGA, by Cyclone V manufactured by Altera Corporation. The block diagram of (b) of FIG. 2 shows a time-division separation block in one (1) lane for generating 8-bit parallel signals by separating a pair of serial signals in a time division manner. The time-division separation block decodes the one pair of serial signals with a method in which the 8B/10B encoding illustrated in (a) of FIG. 2 is reversed, and then separates the decoded serial signals into 8-bit parallel signals with use of a deserializer in a time division manner. Note that the encoding/decoding methods carried out in (a) and (b) of FIG. 2 are not limited to 8B/10B encoding/decoding, and can be, for example, 64B/66B encoding/decoding.

Alternatively, the DEMUX 42 can be configured by a commercially available IC. (b) of FIG. 3 illustrates DS92LV3242 which is a deserializer IC manufactured by Texas Instruments Incorporated and is used as the DEMUX 42 in Embodiment 1. As illustrated in (b) of FIG. 3, the DEMUX 42 can generate 32-bit parallel signals (RxOUT0 through RxOUT31) by separating, in a time division manner, the four pairs of differential signals (+ and − of RxIN0, + and − of RxIN1, + and − of RxIN2, and + and − of RxIN3) which have been obtained.

The DEMUX 42 supplies, to the signal processing section 43, (i) three image signals which are included in the 32-bit parallel signals generated by the time division separation and (ii) the synchronization signals.

With use of the synchronization signals, the signal processing section 43 converts the three image signals, which are parallel signals obtained from the DEMUX 42, into image signals in a format in which the grabber 40 can process the image signals. The signal processing section 43 supplies, to the grabber controller 41, the three image signals whose format has been converted to the format in which the grabber 40 can process the image signals. The grabber controller 41 supplies the three image signals to the computer which serves as the image processing device.

The power source section 44 supplies electric power to the grabber controller 41, the DEMUX 42, and the signal processing section 43 which are provided in the grabber 40 and also supplies electric power through the electric power line 15. The power source section 44 can be configured by an existing technique (e.g., a power over camera link (PoCL) technique in a camera link cable), provided that the power source section 44 can supply predetermined electric power to the grabber 40, the active optical cable 10, and the camera 30.

(Monitoring Camera-Side Connector 11 and Grabber-Side Connector 12)

As above described, the camera-side connector 11 provided to the active optical cable 10 includes the E/O conversion section 112 and the O/E conversion section 113, and the grabber-side connector 12 provided to the active optical cable 10 includes the E/O conversion section 122 and the O/E conversion section 123. As above described, in order to convert an electric signal into an optical signal, each of the E/O conversion sections 112 and 122 includes the laser element which emits laser light that is a medium of the optical signal.

In general, power of laser light emitted by a laser element greatly depends on a bias current of the laser element and a temperature of the laser element. In view of this, the grabber 40 which is connected with the active optical cable 10 is configured to (i) obtain bias current information (hereinafter, referred to as "first bias current information) which is indicative of a bias current of a laser element (hereinafter, referred to as "first laser element) of the E/O conversion section 112 included in the camera-side connector 11 and temperature information (hereinafter, referred to as "first temperature information) which is indicative of a temperature inside (in the vicinity of the first laser element) the camera-side connector 11. Further, the grabber 40 is also configured to (ii) obtain bias current information (hereinafter, referred to as "second bias current information) which is indicative of a bias current of a laser element (hereinafter, referred to as "second laser element) of the E/O conversion section 122 included in the grabber-side connector 12 and temperature information (hereinafter, referred to as "second temperature information) which is indicative of a temperature inside (in the vicinity of the second laser element) the grabber-side connector. Note that, in the following descriptions, the first bias current information and the first temperature information which indicate an internal state of the camera-side connector 11 are collectively referred to as "first internal information", and the second bias current information and the second temperature information which indicate an internal state of the grabber-side connector 12 are collectively referred to as "second internal information".

As such, the operation in which the grabber 40 obtains the first internal information from the camera-side connector 11 and thereby grasps the internal state of the camera-side connector 11 is called as follows: that is, "the grabber 40 monitors the internal state of the camera-side connector 11". Similarly, the operation in which the grabber 40 obtains the second internal information from the grabber-side connector 12 and thereby grasps the internal state of the grabber-side connector 12 is called as follows: that is, "the grabber 40 monitors the internal state of the grabber-side connector 12".

(Method for Monitoring Camera-Side Connector 11)

The following description will discuss a monitoring method in a case where the grabber 40 monitors the camera-side connector 11, with reference to FIG. 4. Subsequently, a control method in a case where the grabber 40 controls the camera-side connector 11 will be described with reference to FIG. 5. Further, the camera control signal, the camera-side connector control signal, and the grabber-side connector control signal will be described with reference to FIG. 6. FIG. 4 is a flowchart showing a case where the grabber 40 monitors the camera-side connector 11. FIG. 5 is a flowchart showing a case where the grabber 40 controls the camera-side connector 11. FIG. 6 is a table showing an example of data structures of the camera control signal, the camera-side connector control signal, and the grabber-side connector control signal.

The following description will discuss a case in which the grabber 40 transmits, to the camera-side connector 11, a camera-side connector monitor signal for monitoring the camera-side connector 11, and then the camera-side connector 11 transmits first internal information to the grabber 40 based on the camera-side connector monitor signal which has been received. Note that the monitoring of the camera-side connector 11 which is carried out by the grabber 40 which transmits the camera-side connector monitor signal and obtains the internal information of the camera-side connector 11 can be considered as an aspect of controlling the camera-side connector 11 which will be described later. In view of this, in the descriptions below, the camera-side connector monitor signal for monitoring the camera-side connector 11 and the camera-side connector control signal for controlling the camera-side connector 11 are sometimes not distinguished and are also collectively referred to as "camera-side connector control signal".

First, with reference to FIG. 6, an example of data structures of the camera control signal and the camera-side connector control signal is described. As shown in FIG. 6, each of the camera control signal and the camera-side connector control signal is, for example, a 14-byte serial command as defined by the data structure shown in FIG. 6.

The command of the first byte through the sixth byte is used to specify a camera which is to be controlled by the camera control signal. In order to identify the camera from the other cameras, specific identification numbers are assigned to respective cameras which are used in the image transmission/reception system 1. Moreover, in the image transmission/reception system 1, identification numbers are also assigned to the camera-side connector and the grabber-side connector of the active optical cable which is included in the image transmission/reception system 1, as with the cameras in the image transmission/reception system 1.

An identification number of the camera 30 is "000001", an identification number of the camera-side connector 11 is "000002", and an identification number of the grabber-side connector 12 is "000003". In a case where a camera control signal for controlling the camera 30 is generated, the computer which is the image processing device generates a camera control signal in which a command of the first byte through the sixth byte is "000001". Moreover, in a case where a camera control signal for controlling the camera-side connector 11 is generated, a command of the first byte through the sixth byte can be "000002", and in a case where a camera control signal for controlling the grabber-side connector 12 is generated, a command of the first byte through the sixth byte can be "000003".

A command of the seventh byte is a command for specifying a process code of a camera control signal, and a command corresponding any of a read mode (R), a write mode (W), and an ACK mode (A) is specified.

A command of the eighth byte through the 10th byte specifies an address of EEPROM (Registered Trademark)/RAM included in any of the camera 30, the camera-side connector 11, and the grabber-side connector 12.

A command of the 11th byte through the 13th byte specifies execution data which is written, in the write mode, at the address of the EEPROM (Registered Trademark)/RAM that is specified by the command of the eighth byte through the 10th byte. Note that, in the read mode and the ACK mode, the command of the 11th byte through the 13th byte is not particularly specified.

A command of the 14th byte is specified by "0Dh" which means that the command is a last command in the camera control signal.

Next, the following description will discuss, with reference to FIG. 4, a monitoring method in which the grabber 40 monitors the camera-side connector 11. As later described in a section of "Method for controlling camera-side connector 11", in a case where the grabber 40 controls the camera-side connector 11, the connector control section 412 generates a camera-side connector control signal for controlling the camera-side connector 11 and supplies the camera-side connector control signal to the encoder 411 (see step S111). Meanwhile, in a case where the grabber 40 monitors the camera-side connector 11, the connector control section 412 does not generate a camera-side connector control signal for controlling the camera-side connector 11. That is, the connector control section 412 does not supply a camera-side connector control signal to the encoder 411. Therefore, in this case, the encoder 411 obtains only the camera control signal from the computer. The encoder 411 converts the camera control signal, which has been obtained from the computer, in a data transmission format, and supplies the camera control signal to the E/O conversion section 122 of the grabber-side connector 12.

In this description, the camera control signal is assumed to be a 14-byte serial command. Note, however, that the camera control signal can be a universal standard command as defined in Genicam (EMVA, http://www.emva.org/cms/index.php?idcat=27).

Next, the following description will discuss a monitoring method in which the grabber 40 monitors the camera-side connector 11.

In a case where the connector control section 412 of the grabber controller 41 controls the camera-side connector 11, the connector control section 412 generates a camera-side connector control signal for controlling the camera-side connector 11 and supplies the camera-side connector control signal to the encoder 411 (step S111). Here, a data structure of the camera-side connector control signal is identical with the data structure of the camera control signal shown in FIG. 6. Therefore, in a case where the camera-side connector 11 is specified as a control target, the connector control section 412 can set the command of the first byte through the sixth byte to "000002".

As a command of the seventh byte through the 13th byte, a command for causing the camera-side connector 11 to transmit first internal information, in other words, a command corresponding to control of reading the first internal information from the camera-side connector 11 is specified. Specifically, "R" corresponding to the read mode is specified as a command of the seventh byte, and a predetermined address of EEPROM/RAM in the camera-side controller 111 of the camera-side connector 11 is specified as a command of the eighth byte through the 10th byte. In the camera-side connector control signal for monitoring, no content is specified in the 11th byte through the 13th byte.

The encoder 411 obtains a camera control signal (image transmission device control signal) for controlling the camera 30 from the computer which is the image processing device (step S112). As above described, in the camera control signal, the command of the first byte through the sixth byte is "000001".

The encoder 411 converts the camera-side connector control signal for controlling the camera-side connector 11 in the data transmission format as with the camera control signal, and supplies the camera-side connector control signal to the E/O conversion section 122 of the grabber-side connector 12 (step S113). As such, the encoder 411 supplies the camera control signal and the camera-side connector control signal to the E/O conversion section 122 via the same transmission path. In a case where a timing of obtaining the camera control signal overlaps with a timing of obtaining the camera-side connector control signal, it is possible to employ a configuration in which any one of the control signals (e.g., the camera control signal) is first supplied to the E/O conversion section 122 and then the other control signal (e.g., the camera-side connector control signal) is supplied to the E/O conversion section 122. In this case, the encoder 411 functions as an inserting section for inserting the camera-side connector control signal into a no-signal period of the camera control signal. In a case where a command transmission format is prepared in which two control signals, i.e., the camera control signal and the camera-side connector control signal can be transmitted with use of one (1) command, the encoder 411 can be configured to supply the camera control signal and the camera-side connector control signal together to the E/O conversion section 122. In this case, the encoder 411 functions as a superimposing section for superimposing the camera-side connector control signal on the camera control signal. In the descriptions below, the encoder 411 is assumed to function as the superimposing section for superimposing the camera-side connector control signal on the camera control signal.

The E/O conversion section 122 converts an aspect of the camera control signal and the camera-side connector control signal, which have been obtained from the encoder 411, from an electric signal to an optical signal. Subsequently, the E/O conversion section 122 couples the camera control signal and the camera-side connector control signal, which have been converted to the optical signals, with the optical fiber 141 of the upstream optical fiber 14. Through the optical fiber 141, the camera control signal and the camera-side connector control signal are transmitted from the E/O conversion section 122 of the grabber-side connector 12 to the O/E conversion section 113 of the camera-side connector 11.

The O/E conversion section 113 converts an aspect of the camera control signal and the camera-side connector control signal, which have been transmitted through the optical fiber 141, from an optical signal to an electric signal. Subsequently, the O/E conversion section 113 supplies the camera control signal and the camera-side connector control signal, which have been converted to the electric signals, to the decoder 311 of the camera controller 31.

The decoder 311 receives the camera control signal on which the camera-side connector control signal transmitted via the E/O conversion section 122, the optical fiber 141, and the O/E conversion section 113 is being superimposed (step S114).

The decoder 311 converts the format of the camera control signal and the camera-side connector control signal, which have been obtained, from the data transmission format to a format in which the camera controller 31 (and also the computer that is the image processing device) can process the camera control signal and the camera-side connector control signal. In other words, the decoder 311 restores the format of the camera control signal and the camera-side connector control signal, which have been converted by the encoder 411, to the original format.

Further, the decoder 311 refers to the command of the first byte through the sixth byte in the converted control signal so as to judge to which one of the camera-side connector 11, the camera 30, and another destination the camera control signal or the camera-side connector control signal is directed (step S115). In other words, the decoder 311 checks the identification numbers contained in the control signals and sorts the control signals into controllers for the respective apparatuses (camera 40, camera-side connector 11, and grabber-side connector 12) so as to separate the camera control signal, the camera-side connector control signal, and the grabber-side connector control signal from each other.

In a case where the command of the first byte through the sixth byte is the identification number "000002" indicating the camera-side connector 11, the decoder 311 determines that the converted control signal is a camera-side connector control signal for controlling the camera-side connector 11, and supplies the control signal to the connector control section 312 (step S116).

The connector control section 312 supplies the camera-side connector control signal, which has been obtained, to the camera-side controller 111 of the camera-side connector 11 (step S117). Therefore, the decoder 311 can be considered as a separating section which separates, from the camera control signal, the camera-side connector control signal for controlling the camera-side connector 11 and supplies the separated camera-side connector control signal to the camera-side connector 11.

In a case where the camera-side controller 111 has obtained, from the connector control section 312, the camera-side connector control signal for controlling the camera-side connector 11, the camera-side controller 111 controls the internal information supplying section 111a to obtain internal information indicative of the internal state of the camera-side controller 111 in accordance with (i) "R" which represents the read mode and is specified by the seventh byte in the obtained camera-side connector control signal and (ii) an address of EEPROM/RAM specified by the eighth byte through the 10th byte in the obtained camera-side connector control signal. Specifically, the internal information supplying section 111a obtains first bias current information from the E/O conversion section 112 and obtains first temperature information from the temperature sensor 114 (step S118).

As illustrated in FIG. 1, a signal line through which two-way communication can be carried out is provided between the camera-side controller 111 of the camera-side connector 11 and the connector control section 312 in the camera controller 31 provided in the camera 30. The internal information supplying section 111a supplies the first bias current information and the first temperature information which have been obtained, that is, the first internal information to the connector control section 312 via the signal line (supplying step: step S119). The connector control section 312 is an obtaining section for obtaining first internal information from the internal information supplying section 111a.

The connector control section 312 supplies, to the MUX 35, the first internal information which has been supplied from the internal information supplying section 111a.

The MUX 35 carries out time-division multiplexing with respect to (i) the image signal which includes three parallel signal sequences and has been obtained from the signal processing section 34, (ii) the synchronization signals, and (iii) the first internal information, and thus generates first through fourth image signals (i.e., four pairs of differential signals). In other words, the MUX 35 which is the superimposing section superimposes the first internal information, which has been obtained from the camera-side connector 11, on the image signal which is to be transmitted to the grabber 40 via the active optical cable 10 (superimposing step: step S120).

An aspect of the first through fourth image signals on which the first internal information is being superimposed is converted from the electric signal to the optical signal by the E/O conversion section 112 in the camera-side connector 11, and the first through fourth image signals are then transmitted to the grabber-side connector 12 via the downstream optical fiber 13. The O/E conversion section 123 of the grabber-side connector 12 converts an aspect of the received first through fourth image signals from the optical signal to the electric signal, and supplies the converted image signals to the DEMUX 42.

The DEMUX 42 carries out time division separation on the obtained first through fourth image signals, and thus restores the image signal including three parallel signal sequences, the synchronization signals, and the first internal information. In other words, the DEMUX 42 which is the separating section separates the first internal information from the image signals which have been received from the camera 30 via the active optical cable 10. The DEMUX 42 supplies (i) the image signal including three image signals and (ii) the synchronization signals to the signal processing section 43. Moreover, the DEMUX 42 supplies the first internal information to the connector control section 412 of the grabber controller 41.

Through those processes, the grabber controller 41 of the grabber 40 can monitor the internal state of the camera-side connector 11 even without a signal line via which the camera-side controller 111 and the grabber-side controller 121 are connected with each other so that two-way communication can be carried out.

Here, it is described that the internal information supplying section 111a of the camera-side controller 111 obtains the first internal information from the E/O conversion section 112 and the temperature sensor 14 based on the camera-side connector control signal supplied from the grabber 40 and supplies the first internal information to the connector control section 312. Note, however, that the internal information supplying section 111a can be configured to obtain and supply first internal information at predetermined timings. The predetermined timings can be periodic or can be non-periodic. In a case where the predetermined timings are periodic, a first obtaining interval at which the first bias current information and the first temperature information are obtained is not particularly limited. For example, the first obtaining interval can be set to 10 seconds. Note that the timing at which the first bias current information is obtained and the timing at which the first temperature information is obtained can be identical timings or can be different timings.

Note that, in a case where the command of the first byte through the sixth byte in the camera control signal or the camera-side connector control signal is the identification number "000001" indicating the camera 30 in the step S115, the camera controller 31 determines that the received control signal is a camera control signal for controlling the camera 30, and controls the components of the camera 30 in accordance with the command specified in the seventh byte through the 13th byte (step S131).

In a case where the command of the first byte through the sixth byte in the camera control signal or the camera-side connector control signal is neither the identification number "000001" indicating the camera 30 nor the identification number "000002" indicating the camera-side connector 11 in the step S115, the camera controller 31 transmits, to the grabber 40, a negative-acknowledge (NACK) signal which is a response signal meaning that a control indicated by the received camera control signal or camera-side connector control signal has not been carried out (step S141). In Embodiment 1, the NACK signal uses a NACK mode among four process codes (read mode, write mode, ACK mode, and NACK mode) of the control signal shown in FIG. 6. That is, the camera controller 31 specifies "N", which represents the NACK mode, as the command of the seventh byte of the NACK signal. Moreover, the camera controller 31 specifies, as the command of the first byte through the sixth byte of the NACK signal, "000001" which is the identification number of the camera 30. From these, it is possible to clarify that the NACK signal is a NACK signal generated by the camera controller 31.

(Method for Monitoring Grabber-Side Connector 12)

The following description will discuss a monitoring method in a case where the grabber 40 monitors the grabber-side connector 12. The internal information supplying section 121a of the grabber-side controller 121 periodically obtains second bias current information from the E/O conversion section 122 and also periodically obtains second temperature information from the temperature sensor 124. A second obtaining interval at which the second bias current information and the second temperature information are obtained is not particularly limited. Here, it is assumed that the second obtaining interval is set to 10 seconds. Note that the timing at which the second bias current information is obtained and the timing at which the second temperature information is obtained can be identical timings or can be different timings.

As illustrated in FIG. 1, a signal line through which two-way communication can be carried out is provided between the grabber-side controller 121 of the grabber-side connector 12 and the connector control section 412 in the grabber controller 41 provided in the grabber 40. The internal information supplying section 121a supplies the second bias current information and the second temperature information which have been obtained, that is, the second internal information to the connector control section 412 via the signal line.

Through those processes, the grabber controller 41 of the grabber 40 can monitor the internal state of the grabber-side connector 12.

Here, the monitoring of the grabber-side connector 12 has been described with reference to the case where the second bias current information and the second temperature information are used as concrete examples of the internal information. Moreover, in the monitoring method of monitoring the camera-side connector 11, the monitoring of the camera-side connector 11 has been described with reference to the case where the first bias current information and the first temperature information are used as concrete examples of the internal information. Note, however, that the pieces of internal information which are obtained by the grabber 40 from the camera-side connector 11 and the grabber-side connector 12 are not limited to those. That is, active elements to be monitored by the grabber 40 are not limited to the E/O conversion sections 112 and 122, and can be the O/E conversion sections 113 and 123. For example, the grabber 40 can obtain, as internal information indicative of a state of the O/E conversion section 113, an electric current value which is outputted from the light receiving section of the O/E conversion section 113 to the camera controller 31, in other words, first received light power information which is indicative of received light power. Moreover, the grabber 40 can obtain, as internal information indicative of a state of the O/E conversion section 123, an electric current value which is outputted from the light receiving section of the O/E conversion section 123 to the DEMUX 42, in other words, second received light power information which is indicative of received light power. The electric current values which are outputted by the respective light receiving sections included in the O/E conversion sections 113 and 123 correspond to powers of optical signals which are received by the respective light receiving sections.

(Controlling Camera-Side Connector 11 and Grabber-Side Connector 12)

The above description has discussed the method in which the first internal information of the camera-side connector 11 is transmitted from the camera-side connector 11 to the grabber 40 via the camera 30, and thus the grabber 40 monitors the camera-side connector 11. Moreover, the method has been described in which the second internal information of the grabber-side connector 12 is transmitted to the grabber 40 from the grabber-side connector 12, and thus the grabber 40 monitors the grabber-side connector 12. The following descriptions will discuss, first, a method of controlling the camera-side connector 11 by the grabber 40, and then a method of controlling the grabber-side connector 12 by the grabber 40, with reference to FIG. 5.

(Method for Controlling Camera-Side Connector 11)

Here, a description "the grabber 40 controls the camera-side connector 11" means that (1) various parameters of the active elements included in the camera-side connector 11 are changed based on instructions given from the grabber 40 and (2) the first internal information indicative of the internal state of the camera-side connector 11 is controlled to be transmitted from the camera-side connector 11 to the grabber 40. In a case where an active element to be controlled in the camera-side connector 11 is the E/O conversion section 112, parameters which can be changed by the grabber 40 are, for example, a bias current and a modulated current of the first laser element that is provided in the E/O conversion section 112. The grabber 40 transmits a TxDIS signal to the camera-side connector 11 so as to make a state of the first laser element included in the E/O conversion section 112 enabled or disabled. As such, the state (enabled or disabled) of the first laser element is one of the various parameters of the active element. In a case where an active element to be controlled in the camera-side connector 11 is the O/E conversion section 113, the grabber 40 transmits an RxDIS signal to the camera-side connector 11 so as to make a state of the light receiving section (photodiode) included in the O/E conversion section 113 enabled or disabled. As such, the state (enabled or disabled) of the light receiving section is also one of the various parameters of the active element.

In a case where the connector control section 412 of the grabber controller 41 controls the camera-side connector 11, the connector control section 412 generates a camera-side connector control signal for controlling the camera-side connector 11 and supplies the camera-side connector control signal to the encoder 411 (step S211). The step S211 corresponds to the step S111 shown in FIG. 4 and is different from the step S111 in the command of the seventh byte through the 13th byte in the generated camera-side connector control signal.

The connector control section 412 specifies, as the command of the seventh byte through the 13th byte, a command which corresponds to a control to be carried out with respect to the camera-side connector 11. Here, in a case where a content represented by the camera-side connector control signal transmitted from the connector control section 412 to the camera-side connector 11 is "setting a bias current of the laser element included in the E/O conversion section 112 to 10 mA", the command of the seventh byte is set to "W" which corresponds to the write mode, a predetermined address of the EEPROM/RAM in the camera-side controller 111 of the camera-side connector 11 is specified by use of the command of the eighth byte through the 10th byte, and the command of the 11th byte through the 13th byte is specified as a command indicating that the bias current is set to 10 mA.

The steps S212 through S217 are identical with the respective steps S112 through S117 shown in FIG. 4. Therefore, descriptions of the steps S212 through S217 are omitted here.

In a case where the camera-side controller 111 has obtained, from the connector control section 312, the camera-side connector control signal for controlling the camera-side connector 11, the camera-side controller 111 controls the active element of the camera-side connector 11 in accordance with (i) the command "W" which indicates the write mode and is specified in the seventh byte of the obtained camera-side connector control signal, (ii) the address of the EEPROM/RAM specified in the eighth byte through 10th byte, and (iii) data which is to be written into the EEPROM/RAM and is specified in the 11th byte through 13th byte (step S218). Here, the camera-side controller 111 sets the bias current of the laser element included in the E/O conversion section 112 to 10 mA in accordance with the command specified in the seventh byte through 13th byte of the obtained camera-side connector control signal.

In a case where the control (in this case, setting the bias current of the laser element to 10 mA) indicated by the camera-side connector control signal has been carried out (YES in step S219), the camera-side controller 111 supplies, to the connector control section 312 of the camera 30, an acknowledge (ACK) signal as a response signal meaning that the control indicated by the obtained camera-side connector control signal has been carried out (step S220). Alternatively, in a case where the control indicated by the camera-side connector control signal has not been carried out for some reason (NO in step S219), the camera-side controller 111 supplies, to the connector control section 312, a negative-acknowledge (NACK) signal as a response signal meaning that the control indicated by the obtained camera-side connector control signal has not been carried out (step S222). In Embodiment 1, the NACK signal uses a NACK mode among four process codes (read mode, write mode, ACK mode, and NACK mode) of the control signal shown in FIG. 6. That is, the camera-side controller 111 specifies "N", which represents the NACK mode, as the command of the seventh byte of the NACK signal. Moreover, the camera-side controller 111 specifies, as the command of the first byte through the sixth byte of the NACK signal, "000002" which is the identification number of the camera-side connector 11. From these, it is possible to clarify that the NACK signal is a NACK signal generated by the camera-side controller 111.

In the step S222, it is described that the camera-side controller 111 transmits the NACK signal to the grabber 40. Note, however, that, in a case of NO in the step S219, the camera-side controller 111 can be configured to transmit neither an ACK signal nor a NACK signal to the grabber 40. In a case where the grabber 40 does not receive an ACK signal within a predetermined period of time after the camera-side connector control signal has been transmitted, it is possible to determine that the control indicated by the camera-side connector control signal has not been carried out by the camera-side connector 11, that is, a NACK signal has been received from the camera-side controller 111.

In a case where the camera 30 has obtained a response signal (ACK signal or NACK signal) from the camera-side controller 111, the camera 30 transmits a response signal to the grabber 40 with use of a transmission method similar to the method for transmitting the first internal information to the grabber 40 (i.e., the monitoring method for monitoring the camera-side connector 11 by the grabber 40) (step S221). Specifically, the MUX 35 supplies the response signal together with an image signal to the camera-side connector 11 by superimposing the response signal, which has been obtained from the connector control section 312, on the image signal to be transmitted to the grabber 40. When the process of the step S221 has finished, the process of controlling the camera-side connector 11 by the grabber 40 is ended.

Note that, in a case where the command of the first byte through the sixth byte in the camera control signal or the camera-side connector control signal is the identification number "000001" indicating the camera 30 in the step S215, the camera controller 31 determines that the received control signal is a camera control signal for controlling the camera 30, and controls the components of the camera 30 in accordance with the command specified in the seventh byte through 13th byte (step S231).

In a case where the control indicated by the received camera control signal has been carried out (YES in step S232), the camera controller 31 can be configured to transmit, as a response signal meaning that the control indicated by the obtained camera control signal has been carried out, an acknowledge (ACK) signal to the grabber 40 via the MUX 35 (step S233).

Alternatively, in a case where the control indicated by the received camera control signal has not been carried out for some reason (NO in step S232), the camera controller 31 can be configured to transmit, to the grabber 40 via the MUX 35, a negative-acknowledge (NACK) signal as a response signal meaning that the control indicated by the obtained camera control signal has not been carried out (step S234).

In the step S215, in a case where the command of the first byte through the sixth byte is neither the identification number "000001" indicating the camera 30 nor the identification number "000002" indicating the camera-side connector 11, it is possible to employ a configuration as follows, that is, the camera controller 31 transmits, to the grabber 40 via the MUX 35, a negative-acknowledge (NACK) signal as a response signal meaning that the control indicated by the received camera control signal or camera-side connector control signal has not been carried out (step S241), and the process of controlling the camera-side connector 11 by the grabber 40 is ended. The NACK signal which is transmitted by the camera controller 31 in the step S234 and the step S241 can be configured similarly to the NACK signal that is transmitted by the camera controller 31 in the step S141.

Note that, as with the case of the step S222, the camera controller 31 can be configured to transmit neither the ACK signal nor the NACK signal to the grabber 40 in the step S234. Alternatively, the camera controller 31 can be configured to transmit neither the ACK signal nor the NACK signal to the grabber 40 in the step S241.

The above descriptions have discussed the method for controlling the camera-side connector 11 with reference to the example in which the content indicated by the camera-side connector control signal transmitted to the camera-side connector 11 is "setting the bias current of the laser element included in the E/O conversion section 112 to 10 mA". Note that the content indicated by the camera-side connector control signal transmitted to the camera-side connector 11 is not limited to the above example. The content indicated by the camera-side connector control signal can be a control carried out with respect to the active elements (E/O conversion section 112 and O/E conversion section 113) included in the camera-side connector 11, or can be a control for causing the camera-side connector 11 to transmit, to the grabber 40, the first internal information indicative of the internal state of the camera-side connector 11, that is, a control serving as a trigger of monitoring the camera-side connector 11.

Through those processes, in the image transmission/reception system 1, it is possible to transmit, with use of the optical fiber 141 for transmitting a camera control signal, a camera-side connector control signal for controlling the camera-side connector 11. Therefore, the image transmission/reception system 1 does not need to have a transmission path which is dedicated to a camera-side connector control signal and directly connects the camera-side controller 111 with the grabber-side controller 121 for transmitting the camera-side connector control signal from the grabber 40 to the camera 30.

(Method for Controlling Grabber-Side Connector 12)

Next, the following description will discuss a method in which the grabber 40 controls the grabber-side connector 12. Here, the description "the grabber 40 controls the grabber-side connector 12" means that (1)' various parameters of the active elements included in the grabber-side connector 12 are changed based on instructions given from the grabber 40 and (2)' the second internal information indicative of the internal state of the grabber-side connector 12 is controlled to be transmitted from the grabber-side connector 12 to the grabber 40. In a case where an active element to be controlled in the grabber-side connector 12 is the E/O conversion section 122, parameters which can be changed by the grabber 40 are, for example, a bias current and a modulated current of the second laser element that is provided in the E/O conversion section 122. The grabber 40 transmits a TxDIS signal to the grabber-side connector 12 so as to make a state of the second laser element included in the E/O conversion section 122 enabled or disabled. As such, the state (enabled or disabled) of the second laser element is one of the various parameters of the active element. In a case where an active element to be controlled in the camera-side connector 12 is the O/E conversion section 123, the grabber 40 transmits an RxDIS signal to the grabber-side connector 12 so as to make a state of the light receiving section (photodiode) included in the O/E conversion section 123 enabled or disabled. As such, the state (enabled or disabled) of the light receiving section is also one of the various parameters of the active element.

As described in the monitoring method for monitoring the grabber-side connector 12, a signal line for enabling two-way communication is provided between the grabber-side controller 121 of the grabber-side connector 12 and the connector control section 412 of the grabber controller 41 provided in the grabber 40.

The connector control section 412 generates a connector control signal for controlling the grabber-side connector 12 by specifying the command of the first byte through the sixth byte of the connector control signal as "000003". Subsequently, the connector control section 412 supplies the connector control signal, which has been generated, to the grabber-side controller 121 of the grabber-side connector 12.

The grabber-side controller 121 controls at least any of the E/O conversion section 122 and the O/E conversion section 123 based on the connector control signal which has been obtained from the connector control section 412. The grabber-side controller 121 supplies, to the connector control section 412, a response signal (ACK signal or NACK signal) with respect to the connector control signal which has been obtained.

Through those processes, the grabber controller 41 of the grabber 40 can control the grabber-side connector 12. More specifically, the grabber controller 41 can control the active elements (E/O conversion section 122 and O/E conversion section 123) included in the grabber-side connector 12. Note that a control indicated by the connector control signal with respect to the grabber-side connector 12 can be a control carried out with respect to the active elements included in the grabber-side connector 12, or can be a control for causing the grabber-side connector 12 to transmit, to the grabber 40, the second internal information indicative of the internal state of the grabber-side connector 12, that is, a control serving as a trigger of monitoring the grabber-side connector 12.

The grabber 40 can be configured to carry out a feedback control with respect to the camera-side connector 11 in accordance with the obtained first internal information or can be configured to carry out a feedback control with respect to the grabber-side connector 12 in accordance with the obtained second internal information.

The feedback control which is carried out by the grabber 40 with respect to the camera-side connector 11 can be, for example, as follows. In a case where the grabber 40 has detected a temperature rise in a vicinity of the first laser element based on a change in first temperature information, power of the first laser element may be decreased due to the temperature rise. In such a case, the grabber 40 transmits, to the camera-side controller 111, a control signal (i.e., a camera-side connector control signal) for increasing the bias current of the first laser element so as to compensate the decrease in power due to the temperature rise. It is possible to employ a configuration in which a correlation between the temperature in the vicinity of the first laser element and the bias current are obtained in advance, a look-up table in which the temperature and the bias current are associated with each other or the temperature and a collecting amount of the bias current are associated with each other is provided in the grabber 40 so that the grabber controller 41 refers to the look-up table. Alternatively, instead of one look-up table, a plurality of look-up tables can be provided while taking into consideration deterioration with time of the first laser element so that a look-up table to be referred by the grabber controller 41 can be switched in accordance with passage of time.

Embodiment 2

The following description will discuss, with reference to FIG. 7, an image transmission/reception system 2 in accordance with Embodiment 2 of the present invention. Note that, for convenience of explanation, identical reference numerals are given to constituent members having functions identical with those of the constituent members described in Embodiment 1, and descriptions of such constituent members are omitted here. FIG. 7 is a block diagram illustrating a configuration of the image transmission/reception system 2. As illustrated in FIG. 7, the image transmission/reception system 2 includes an active optical cable 20, a camera 30, and a grabber 40. In Embodiment 2, first, a method in which the grabber 40 monitors a grabber-side connector 22 is described, and then a method in which the grabber 40 controls the grabber-side connector 22 is described.

As compared with the image transmission/reception system 1 of Embodiment 1, the image transmission/reception system 2 is different in a configuration of the grabber-side connector 22 included in the active optical cable 20 and in an aspect of connection between the grabber-side connector 22 and a connector control section 412. In the image transmission/reception system 1, the signal line provided between the grabber-side controller 221 and the connector control section 412 enables two-way communication.

Meanwhile, in the image transmission/reception system 2, a camera control signal is supplied from an encoder 411 to the grabber-side controller 221. Moreover, a grabber-side connector control signal generated by the connector control section 412 is supplied to the encoder 411 as with the camera-side connector control signal, and is then supplied to the grabber-side controller 221 from the encoder 411. According to the configuration, it is not necessary to provide a signal line for directly connecting a connector 412 with a decoder 221*b*, and it is therefore possible to simplify connection between the grabber 40 and the grabber-side connector 22. A signal line provided between the grabber-side controller 221 and the encoder 411 is a signal line through which a signal can be transmitted only in a direction from the grabber 40 to the grabber-side controller 221. Therefore, the grabber-side controller 221 cannot directly supply second internal information and a response signal to the connector control section 412. However, the grabber-side controller 221 superimposes second internal information on a camera control signal which is to be transmitted from the grabber 40 to the camera 30, and thus transmits the second internal information to the camera 30. The camera 30 transmits the second internal information to the grabber 40 with a method similar to the monitoring method for monitoring the camera-side connector 11.

As above described, the grabber-side connector 22 can transmit the second internal information to the grabber 40 via the camera 30. In other words, the grabber 40 can monitor an internal state of the grabber-side connector 22 via the camera 30. Here, first, a process is described in which the grabber-side controller 221 of the grabber-side connector 22 transmits a camera control signal for controlling the camera 30 to the camera-side connector 11.

The grabber-side controller 221 includes a decoder 221b and a MUX/encoder 221c, in addition to an internal information supplying section 221a. The decoder 221b converts a format of a camera control signal, which has been obtained from the connector control section 412, from the data transmission format to a format in which the grabber-side controller 221 can process the camera control signal. The decoder 221b supplies the camera control signal, which has been converted, to the MUX/encoder 221c.

The MUX/encoder 221c converts the format of the camera control signal, which has been obtained from the decoder 221b, to the data transmission format again. The MUX/encoder 221c supplies the camera control signal, which has been converted, to the E/O conversion section 122.

The E/O conversion section 122 converts an aspect of the obtained camera control signal from an electric signal to an optical signal, and couples the camera control signal with an optical fiber 141. Through those processes, the grabber-side connector 22 can transmit the camera control signal for controlling the camera 30 to the camera-side connector 11.

Next, a process is described in which the grabber-side controller 221 superimposes second internal information on a camera control signal and then transmits the camera control signal to the camera-side connector 11.

The internal information supplying section 221a of the grabber-side controller 221 periodically obtains second bias current information from the E/O conversion section 122 and periodically obtains second temperature information from the temperature sensor 124. As early described, a second obtaining interval at which the second bias current information and the second temperature information are obtained is not particularly limited. Here, it is assumed that the second obtaining interval is set to 10 seconds. Note that the timing at which the second bias current information is obtained and the timing at which the second temperature information is obtained can be identical timings or can be different timings.

The internal information supplying section 221a supplies, to the MUX/encoder 221c, the second bias current information and the second temperature information, that is, second internal information.

The MUX/encoder 221c superimposes the second internal information, which has been obtained from the internal information supplying section 221a, on the camera control signal which has been obtained from the decoder 221b. As such, the MUX/encoder 221c serves as a superimposing section for superimposing the second internal information on the camera control signal.

The MUX/encoder 221c converts the format of the camera control signal, on which the second internal information is being superimposed, to the data transmission format again. The MUX/encoder 221c supplies the camera control signal, on which the second internal information is being superimposed, to the E/O conversion section 122.

The E/O conversion section 122 converts an aspect of the camera control signal, on which the second internal information is being superimposed, from an electric signal to an optical signal, and couples the camera control signal with the optical fiber 141. Through those processes, the grabber-side connector 22 can transmit, to the camera-side connector 11, the camera control signal which is for controlling the camera 30 and on which the second internal information is being superimposed.

Note that, in the image transmission/reception system 2, the connector control signal is supplied from the connector control section 412 to the decoder 221b, as with the camera control signal. In a case where a command of the first byte through the sixth byte of the converted connector control signal is "000003", that is, the converted connector control signal is a signal for controlling the grabber-side connector 22, the grabber-side controller 221 controls, based on the connector control signal, at least any of the E/O conversion section 122 and the O/E conversion section 123 which are active elements included in the grabber-side connector 22.

In a case where the command of the first byte through the sixth byte of the converted connector control signal is "000002", that is, the converted connector control signal is a signal for controlling the camera-side connector 11, the grabber-side controller 221 controls the decoder 221b to supply the connector control signal to the MUX/encoder 221c.

The MUX/encoder 221c converts the format of the connector control signal, which has been obtained from the decoder 221b, to the data transmission format again. The MUX/encoder 221c supplies the converted connector control signal to the E/O conversion section 122.

The E/O conversion section 122 converts an aspect of the obtained connector control signal from an electric signal to an optical signal and then couples the connector control signal with the optical fiber 141.

Note that, in a case where a control indicated by the connector control signal for controlling the grabber-side connector 22 has been carried out, the grabber-side controller 221 can be configured to supply, to the MUX/encoder 221c, a response signal (ACK signal) which means that the control has been carried out. Alternatively, in a case where the control indicated by the connector control signal has not been carried out for some reason, the grabber-side controller 221 can be configured to supply, to the MUX/encoder 221c, a response signal (NACK signal) which means that the control indicated by the connector control signal has not been carried out.

In a case where the MUX/encoder 221c has obtained the response signal from the grabber-side controller 221, the MUX/encoder 221c can transmits the response signal to the camera 30 by superimposing the response signal on the camera control signal. The camera 30 can transmits the response signal, which has been obtained from the grabber-side connector 22, to the grabber 40 with a method similar to the method for transmitting the first internal information and the second internal information to the grabber 40.

Next, a method in which the grabber 40 controls the grabber-side connector 22 is described with reference to FIG. 8. FIG. 8 is a flowchart showing a case where the grabber 40 in the image transmission/reception system 2 controls the grabber-side connector 22. Here, an example is described in which a bias current of a laser element (light emitting section) in the E/O conversion section 122 included in the grabber-side connector 22 is controlled.

In a case where the connector control section 412 of the grabber controller 41 controls the grabber-side connector 22, the connector control section 412 generates a grabber-side connector control signal for controlling the grabber-side connector 22 and supplies the grabber-side connector control signal to the encoder 411 (step S311). The grabber-side connector control signal is a control signal for controlling the grabber-side connector 22, and therefore a command of the first byte through the sixth byte specifies "000003" which is the identification number of the grabber-side connector 22.

Moreover, the connector control section 412 specifies, as a command of the seventh byte through the 13th byte, a command corresponding to a control which is to be carried out with respect to the grabber-side connector 22. Here, it is assumed that a control of "setting a bias current of a laser element included in the E/O conversion section 122 to 10 mA" is carried out with respect to the grabber-side connector 22. In this case, the command of the seventh byte is set to "W" which corresponds to the write mode, a predetermined address of the EEPROM/RAM in the grabber-side controller 221 of the grabber-side connector 22 is specified by use of the command of the eighth byte through the 10th byte, and the command of the 11th byte through the 13th byte is specified as a command indicating that the bias current is set to 10 mA.

The steps S312 and S313 are similar to the steps S112 and S113 described in FIG. 4, and therefore the processes in the steps S312 and S313 are omitted here. Note that, as early described, the encoder 411 can be configured to serve as an inserting section for inserting a camera-side connector control signal into a no-signal period of a camera control signal, or can be configured to serve as a superimposing section for superimposing a camera-side connector control signal on a camera control signal. In the descriptions below, it is assumed that the encoder 411 serves as a superimposing section for superimposing a camera-side connector control signal on a camera control signal.

The decoder 221b receives, from the encoder 411, the camera control signal on which the grabber-side connector control signal is being superimposed (step S314). Then, the decoder 311 converts a format of the obtained camera control signal and grabber-side connector control signal from the data transmission format to a format in which the grabber-side controller 221 can process the camera control signal and the grabber-side connector control signal.

Further, the decoder 221b refers to the command of the first byte through the sixth byte of the converted control signal so as to judge whether or not the identification number in the camera control signal or the camera-side connector control signal indicates the grabber-side connector 22 (step S315). In other words, the decoder 221b judges whether or not the identification number in the control signal is the identification number of the grabber-side connector 22 so as to separate the control signal for controlling the grabber-side connector 22 from other control signals for controlling other devices (camera 40 and camera-side connector 11).

In a case where the command of the first byte through the sixth byte is the identification number "000003" indicating the grabber-side connector 22, the decoder 221b determines that the converted control signal is a grabber-side connector control signal for controlling the grabber-side connector 22 and supplies the control signal to the grabber-side controller 221. The grabber-side controller 221 controls the active element in the grabber-side connector 22 in accordance with (i) the command "W" which indicates the write mode and is specified in the seventh byte of the obtained grabber-side connector control signal, (ii) the address of the EEPROM/RAM specified in the eighth byte through 10th byte, and (iii) data which is to be written into the EEPROM/RAM and is specified in the 11th byte through 13th byte (step S316). Here, the grabber-side controller 221 sets the bias current of the laser element included in the E/O conversion section 122 to 10 mA in accordance with the command specified in the seventh byte through 13th byte of the obtained grabber-side connector control signal.

In a case where the control (in this case, setting the bias current of the laser element to 10 mA) indicated by the command of the 11th byte through the 13th byte in the grabber-side connector control signal has been carried out by the grabber-side controller 221 (YES in step S317), the grabber-side controller 221 generates an ACK signal as a response signal meaning that the control indicated by the obtained grabber-side connector control signal has been carried out and supplies the ACK signal to the MUX/encoder 221c (step S318). In Embodiment 2, the ACK signal uses an ACK mode among four process codes (read mode, write mode, ACK mode, and NACK mode) of the control signal shown in FIG. 6. That is, the grabber-side controller 221 specifies "A", which represents the ACK mode, as the command of the seventh byte of the ACK signal. Moreover, the grabber-side controller 221 specifies, as the command of the first byte through the sixth byte of the ACK signal, "000003" which is the identification number of the grabber-side connector 22. From these, it is possible to clarify that the ACK signal is an ACK signal generated by the grabber-side controller 221.

The MUX/encoder 221c converts the format of the ACK signal, which has been obtained from the grabber-side controller 221, to the data transmission format again, and supplies the ACK signal to the E/O conversion section 122 (step S319). The E/O conversion section 122 converts an aspect of the obtained ACK signal from an electric signal to an optical signal, and couples the ACK signal with the optical fiber 141. Through those processes, the grabber-side connector 22 can transmit the ACK signal to the camera 30. The camera 30 transmits the ACK signal to the grabber 40, as with the second internal information.

In a case where the grabber-side controller 221 has not carried out the control indicated by the grabber-side connector control signal for some reason (NO in step S317), the grabber-side controller 221 generates a negative-acknowledge (NACK) signal as a response signal meaning that the control indicated by the obtained grabber-side connector control signal has not been carried out and supplies the NACK signal to the MUX/encoder 221c (step S320). In Embodiment 2, the NACK signal uses the NACK mode among the four process codes (read mode, write mode, ACK mode, and NACK mode) of the control signal shown in FIG. 6. That is, the grabber-side controller 221 specifies the command "N" which indicates the NACK mode as the command of the seventh byte in the NACK signal. Moreover, the grabber-side controller 221 specifies, as the command of the first byte through the sixth byte of the NACK signal, "000003" which is the identification number of the grabber-side connector 22. From these, it is possible to clarify that the NACK signal is a NACK signal generated by the grabber-side controller 221. Subsequently, the NACK signal is transmitted to the grabber 40 via the camera 30, as with the ACK signal.

Note that, as with the above described case of the step S222, in the step S234, the camera controller 31 can be configured to transmit neither an ACK signal nor a NACK signal to the grabber 40. In a case where the grabber 40 does not receive an ACK signal within a predetermined period of time after the grabber-side connector control signal has been transmitted, it is possible to determine that the control indicated by the grabber-side connector control signal has not been carried out by the grabber-side connector 22, that is, a NACK signal has been received.

Moreover, in the step S315, in a case where the command of the first byte through the sixth byte of the control signal does not indicate the identification number "000003" of the grabber-side connector 22, the grabber-side controller 221 supplies the received control signal to the MUX/encoder 221*c* (step S331). The control signal, that is, the camera control signal and the camera-side connector control signal in which the identification number is not "000003" are transmitted to the decoder 311 of the camera 30 via the E/O conversion section 122 and the O/E conversion section 113.

Embodiment 3

The following description will discuss, with reference to FIG. 9, an image transmission/reception system 3 in accordance with Embodiment 3 of the present invention. Note that, for convenience of explanation, identical reference numerals are given to constituent members having functions identical with those of the constituent members described in Embodiments 1 and 2, and descriptions of such constituent members are omitted here. FIG. 9 is a block diagram illustrating a configuration of the image transmission/reception system 3. As illustrated in FIG. 9, the image transmission/reception system 3 includes an active optical cable 50, a camera 60, and a grabber 40.

As compared with the image transmission/reception system 2 of Embodiment 2, the image transmission/reception system 3 is different in a configuration of a camera-side connector 51 included in the active optical cable 50 and in a configuration of the camera 60. The following description will discuss details of a connector control signal for controlling the camera-side connector 51, a camera control signal on which the connector control signal is being superimposed, and first internal information which is indicative of an internal state of the camera-side connector 51.

As described in Embodiment 2, the E/O conversion section 122 included in the grabber-side connector 22 converts an aspect of the camera control signal, which has been obtained from the MUX/encoder 221*c* and on which the connector control signal is being superimposed, from the electric signal to the optical signal. After that, the E/O conversion section 122 couples the camera control signal, which has been converted to the optical signal, with the optical fiber 141. The camera control signal which is the optical signal is transmitted to the O/E conversion section 113 of the camera-side connector 41.

The O/E conversion section 113 converts an aspect of the camera control signal, which has been transmitted from the E/O conversion section 122, from the optical signal to the electric signal. The O/E conversion section 113 supplies the camera control signal, which has been converted to the electric signal, to a decoder 111*b* of a camera-side controller 511.

The decoder 111*b* converts a format of the camera control signal which has been obtained from the O/E conversion section 113 and a format of the connector control signal which is being superimposed on the camera control signal from the data transmission format to a format in which the camera-side controller 511 can process the camera control signal and the connector control signal. The decoder 111*b* supplies, to the camera-side controller 511, the camera control signal and the connector control signal which have been converted.

The camera-side controller 511 refers to the command of the first byte through the sixth byte in the obtained camera control signal and the command of the first byte through the sixth byte in the obtained connector control signal and separates a connector control signal whose command of the first byte through the sixth byte is "000002" from a camera control signal and a connector control signal whose command of the first byte through the sixth byte is not "000002". As such, the camera-side controller 511 serves as a separating section for separating a connector control signal from a camera control signal.

The camera-side controller 511 controls at least any of the E/O conversion section 112 and the O/E conversion section 113 which are active elements based on the separated connector control signal whose command of the first byte through the sixth byte is "000002", that is, the connector control signal for controlling the camera-side connector 51.

The camera-side controller 511 supplies, to a MUX/encoder 111*c*, the camera control signal which has been obtained from the decoder 111*b*.

The MUX/encoder 111*c* encodes a format of the obtained camera control signal to the data transmission format and then supplies the encoded camera control signal to the decoder 311 of the camera controller 51 included in the camera 60.

The decoder 311 decodes a format of the obtained camera control signal from the data transmission format to a format in which a camera controller 61 can process the camera control signal. The decoder 311 supplies the decoded camera control signal to the camera controller 61.

The camera controller 61 refers to the command of the first byte through the sixth byte in the obtained camera control signal, and in a case where the command of the first byte through the sixth byte is "000001", the camera controller 61 determines that the camera 60 is to be controlled, and controls the components included in the camera 60 based on the camera control signal.

The above description has discussed the process in which the camera control signal is transmitted to the camera 60 and the control indicated by the camera control signal is carried out by the camera 60. Next, a process will be described in which internal information which is indicative of an internal state of the camera-side connector 51 is supplied to the camera 60 while being superimposed on a camera control signal.

The internal information supplying section 111*a* of the camera-side controller 511 periodically obtains first bias current information from the E/O conversion section 112 and also periodically obtains first temperature information from the temperature sensor 114. As early described, a first obtaining interval at which the first bias current information and the first temperature information are obtained is not particularly limited.

The internal information supplying section 111*a* supplies, to the MUX/encoder 111*c*, the first bias current information and the first temperature information, that is, first internal information.

The MUX/encoder 111*c* superimposes the first internal information, which has been obtained from the internal information supplying section 111*a*, on the camera control signal which has been obtained from the decoder 111*b*. As such, the MUX/encoder 111*c* serves as a superimposing section for superimposing the first internal information on the camera control signal.

The MUX/encoder 111c converts a format of the camera control signal, on which the first internal information has been superimposed, to the data transmission format again. The MUX/encoder 111c supplies, to the decoder 311, the camera control signal on which the first internal information is being superimposed.

The decoder 311 supplies the first internal information, which has been superimposed on the camera control signal, to the MUX 35. The MUX 35 included in the camera 60 can transmit the first internal information to the grabber 40 with use of the monitoring method for monitoring the camera-side connector which has been described in Embodiment 1.

Embodiment 4

The following description will discuss, with reference to FIG. 10, an image transmission/reception system 4 in accordance with Embodiment 4 of the present invention. Note that, for convenience of explanation, identical reference numerals are given to constituent members having functions identical with those of the constituent members described in Embodiments 1 through 3, and descriptions of such constituent members are omitted here. FIG. 10 is a block diagram illustrating a configuration of the image transmission/reception system 4. As illustrated in FIG. 10, the image transmission/reception system 4 includes an active optical cable 70, a camera 30, and a grabber 40.

As compared with the image transmission/reception system 1 of Embodiment 1, the image transmission/reception system 4 is different in a configuration of an upstream optical fiber 74 included in the active optical cable. In the image transmission/reception system 1, the upstream optical fiber 14 is made up of the optical fibers 141 and 142, and the connector control signal for controlling the camera-side connector 11 is transmitted to the camera-side connector 11 while being superimposed on the camera control signal. Moreover, in the image transmission/reception system 2, the second internal information indicative of the internal state of the grabber-side connector 22 is transmitted to the camera-side connector 11 while being superimposed on the camera control signal.

Meanwhile, in the image transmission/reception system 4, the upstream optical fiber 74 is made up of four optical fibers, i.e., optical fibers 741 through 744. The E/O conversion section 122 obtains, from the grabber 40, a trigger signal, a camera control signal, and a connector control signal for controlling a camera-side connector 71. The E/O conversion section 122 obtains, from the grabber-side controller 121, second internal information which is indicative of an internal state of a grabber-side connector 72.

The E/O conversion section 122 converts an aspect of the trigger signal, the camera control signal, the connector control signal, and the second internal information from electric signals to optical signals, couples the trigger signal with the optical fiber 741, couples the camera control signal with the optical fiber 742, couples the connector control signal with the optical fiber 743, and couples the second internal information with the optical fiber 744.

An O/E conversion section 113 of the camera-side connector 71 obtains the trigger signal via the optical fiber 741, obtains the camera control signal via the optical fiber 742, obtains the connector control signal via the optical fiber 743, and obtains the second internal information via the optical fiber 744. The O/E conversion section 113 converts the aspect of the trigger signal, the camera control signal, the connector control signal, and the second internal information, which have been obtained, from the optical signals to the electric signals. The O/E conversion section 113 supplies the trigger signal, the camera control signal, and the second internal information, which have been converted, to a decoder 311 of the camera 30 and also supplies the converted connector control signal to a camera-side controller 111.

The camera-side controller 111 controls at least any of the E/O conversion section 112 and the O/E conversion section 113 which are active elements in accordance with a control indicated by the obtained connector control signal. As such, the grabber 40 can control the camera-side connector 71.

Moreover, the camera-side controller 111 of the camera-side connector 71 can supply first internal information to a connector control section 312 included in the camera 30. Therefore, the grabber 40 can monitor an internal state of the camera-side connector 71 with use of the monitoring method for monitoring the camera-side controller described in Embodiment 1.

As such, the image transmission/reception system 4 can be configured by connecting the camera 30 with the grabber 40 with use of the active optical cable 70 including the four upstream optical fibers and four downstream optical fibers. Therefore, in a case where the technique of a QSFP active optical cable is applied to the active optical cable 70, the image transmission/reception system 4 can be provided by using a simple configuration. This is because, in the active optical cable 70, the camera-side connector control signal does not need to be superimposed on the camera control signal.

Meanwhile, each of the active optical cables 10, 20, and 50 in respective of Embodiments 1 through 3 merely needs to include (i) the optical fiber 141 via which the camera control signal on which the camera-side connector control signal is being superimposed is transmitted and (ii) the optical fiber 142 via which the trigger signal is transmitted, and does not need to include the other two optical fibers. Moreover, the E/O conversion section 122 included in the grabber-side connector 12 merely needs to set two light emitting sections to be disabled and make two light emitting sections (i.e., a light emitting section for coupling the camera control signal with the optical fiber 141 and a light emitting section for coupling the trigger signal with the optical fiber 142) to be enabled. As such, in a case where the technique of the QSFP active optical cable is applied, each of the active optical cables 10, 20, and 50 can achieve the image transmission/reception system with less components (i.e., with a simplified configuration). Further, each of the active optical cables 10, 20, and 50 can reduce power consumption by the E/O conversion section 122.

Embodiment 5

The following description will discuss, with reference to FIG. 11, an image transmission/reception system 5 in accordance with Embodiment 5 of the present invention. Note that, for convenience of explanation, identical reference numerals are given to constituent members having functions identical with those of the constituent members described in Embodiments 1 through 4, and descriptions of such constituent members are omitted here. FIG. 11 is a block diagram illustrating a configuration of the image transmission/reception system 5. As illustrated in FIG. 11, the image transmission/reception system 5 includes an active metal cable 80, a camera 30, and a grabber 40.

The image transmission/reception system 5 is obtained by replacing the active optical cable 10 of the image transmission/reception system 1 in accordance with Embodiment 1 with the active metal cable 80. The active optical cable 10 includes (1) the downstream optical fiber 13 which is an optical fiber serving as a downstream signal line via which an image signal, on which at least first internal information is being superimposed, is transmitted from the camera 30 to the grabber 40 and (2) the upstream optical fiber 14 which is an optical fiber serving as an upstream signal line via which a camera control signal and a trigger signal are transmitted from the grabber 40 to the camera 30.

Meanwhile, the active metal cable 80 includes (1) a downstream differential line 83 as a downstream signal line and (2) an upstream differential line 84 as an upstream signal line. The downstream differential line 83 includes a first differential line 831, a second differential line 832, a third differential line 833, and a fourth differential line 834 which are respective metal signal lines. The upstream differential line 84 includes a fifth differential line 841 and a sixth differential line 842 which are respective metal signal lines.

A camera-side connector 81 which is provided at one end of the active metal cable 80 includes a de-emphasis section 812, and a grabber-side connector 82 which is provided at the other end of the active metal cable 80 includes an equalizer 823.

The de-emphasis section 812 carries out signal conditioning for reducing a low-frequency component in an image signal which has been obtained from a MUX 35 of the camera 30 and transmits the image signal, which has been subjected to the signal conditioning, via the downstream differential line 83. By the signal conditioning, the equalizer 823 which is a reception circuit can receive the image signal that has a frequency characteristic suitable for equalizing. The de-emphasis section 812 is one of the active elements and supplies, to the camera-side controller 111, first gain information which is internal information and indicates a gain for use in signal conditioning of the image signal.

The equalizer 823 optimizes the frequency characteristic of the image signal which has been received from the de-emphasis section 812 via the downstream differential line 83 and supplies the image signal, whose frequency characteristic has been optimized, to a DEMUX 42 of the grabber 40. By optimizing the frequency characteristic, it is possible to further open an eye pattern of the image signal. The equalizer 823 is one of the active elements and supplies, to the grabber-side controller 121, second gain information which is internal information and indicates a gain for use in optimizing the frequency characteristic of the image signal.

As such, each of the camera-side connector 81 and the grabber-side connector 82 of the active metal cable 80 includes the active element. Therefore, the active metal cable 80 can be considered as an active cable including a metal signal line.

Note that the active metal cable 80 of Embodiment 5 is obtained by (1) replacing the E/O conversion section 112, the O/E conversion section 123, and the downstream optical fiber 13 of the active optical cable 10 in accordance with Embodiment 1 with the de-emphasis section 812, the equalizer 823, and the downstream differential line 83, respectively, and (2) replacing the E/O conversion section 122, the O/E conversion section 113, and the optical fiber 14 of the active optical cable 10 with the differential line 84. Similarly, each of the active optical cables 20, 50, and 70 of Embodiments 2 through 4 can be replaced with the active metal cable including the de-emphasis section 812 and the equalizer 823.

Note that the E/O conversion section 112, the O/E conversion section 123, and the downstream optical fiber 13, which are provided in each of the image transmission/ reception systems described in Embodiments 2 through 4 can be replaced with the de-emphasis section 812, the equalizer 823, and the downstream differential line 83 included in the active metal cable 80, respectively.

First Modification Example

The following description will discuss, with reference to FIG. 12, an image transmission/reception system 5' which is a modification example of the image transmission/reception system 5 described in Embodiment 5. Note that, for convenience of explanation, identical reference numerals are given to constituent members having functions identical with those of the constituent members described in Embodiments 1 through 5, and descriptions of such constituent members are omitted here. FIG. 12 is a block diagram illustrating a configuration of the image transmission/reception system 5'. As illustrated in FIG. 12, the image transmission/reception system 5' includes an active metal cable 80', a camera 30, and a grabber 40.

The image transmission/reception system 5' is obtained by replacing the active metal cable 80 included in the image transmission/reception system 5 with the active metal cable 80'. A camera-side connector 85 of the active metal cable 80' includes a serializer 812' instead of the de-emphasis section 812, and a grabber-side connector of the active metal cable 80' includes a deserializer 823' instead of the equalizer 823. The camera-side connector 85 and the grabber-side connector 86 are connected with each other via one (1) downstream differential line 87.

The serializer 812' serializes image signals (first through fourth image signals) which are four pairs of differential signals obtained from the MUX 35 into an image signal which is one pair of serial signals. Subsequently, the serializer 812' transmits the image signal which is the one pair of serial signals thus serialized to the deserializer 823' via the downstream differential line 87. The serializer 812' is one of active elements and supplies, to the camera-side controller 111, first PLL lock detection information which is internal information and indicates whether or not PLL lock detection has succeeded.

The deserializer 123' deserializes the image signal, which is the one pair of serial signals received from the serializer 812' via the downstream differential line 87, into image signals which are four pairs of differential signals. Subsequently, the deserializer 823' supplies the image signals, which are four pairs of differential signals thus deserialized, to a DEMUX 42 of the grabber 40. The deserializer 823' is one of active elements and supplies, to the grabber-side controller 121, second PLL lock detection information which is internal information and indicates whether or not PLL lock detection has succeeded.

By thus transmitting the one image signal, which has been obtained by serialization, from the camera-side connector 85 to the grabber-side connector 86, it is possible to reduce the number of differential lines which constitute the downstream differential line.

Note that the active metal cable 80' of this modification example can be obtained by (1) replacing the E/O conversion section 112, the O/E conversion section 123, and the downstream optical fiber 13 of the active optical cable 10 in accordance with Embodiment 1 with the serializer 812', the deserializer 823', and the downstream differential line 83, respectively, and (2) replacing the E/O conversion section 122, the O/E conversion section 113, and the optical fiber 14 of the active optical cable 10 with the differential line 84. Similarly, each of the active optical cables 20, 50, and 70 of Embodiments 2 through 4 can be replaced with the active metal cable including the serializer 812' and the deserializer 823'.

Second Modification Example

The following description will discuss, with reference to FIG. 13, an image transmission/reception system 9 which is a modification example of the image transmission/reception system 1 described in Embodiment 1. Note that, for convenience of explanation, identical reference numerals are given to constituent members having functions identical with those of the constituent members described in Embodiments 1 through 5, and descriptions of such constituent members are omitted here. FIG. 13 is a block diagram illustrating a configuration of the image transmission/reception system 9. As illustrated in FIG. 13, the image transmission/reception system 9 includes an active optical cable 90, a camera 130, and a grabber 40.

The image transmission/reception system 9 can be obtained by replacing the active optical cable 10 in the image transmission/reception system 1 with the active optical cable 90 and replacing the camera 30 in the image transmission/reception system 1 with the camera 130.

The camera 130 can be obtained by replacing the voltage conversion section 36, which is included in the camera 30, with a power source section 136. The power source section 136 supplies electric power to a camera controller 31, a sensor unit 32, a signal processing section 34, and a MUX 35 which are included in the camera 130 and also supplies electric power to a second electric power line 95b. The power source section 136 can be configured by using an existing technique (e.g., the technique of a QSFP active optical cable), provided that the power source section 136 can supply predetermined electric power to the camera 130 and to the active optical cable 90.

The active optical cable 90 includes a first electric power line 95a and a second electric power line 95b, instead of the electric power line 15 included in the active optical cable 10. The first electric power line 95a is connected with the power source section 136 in the camera 130. The second electric power line 95b is connected to a power source section 44 of the grabber 40.

According to the configuration, it is not necessary to provide an electric power line 15, which is a metal wire, between a camera-side connector 91 and a grabber-side connector 92. That is, in the active optical cable 90, it is possible to achieve a "completely optical configuration" in which a metal wire is excluded from connection between the camera-side connector 91 and the grabber-side connector 92. By the "completely optical configuration", the active optical cable 90 can have a more flexible cable part, a reduced diameter, and a reduced weight, as compared with the active optical cable 10 which includes the metal wire.

The active optical cable 90 configured as above described has high compatibility with an image transmission/reception system in which an existing QSFP active optical cable is used. In the image transmission/reception system using the existing QSFP active optical cable, a camera and a grabber include respective power source sections for supplying electric power to a camera-side connector and a grabber-side connector of an active optical cable. That is, as the camera 130 of this modification example, a camera in the image transmission/reception system in which the existing QSFP active optical cable is used can be employed.

Therefore, the active optical cable 90 can provide the "completely optical configuration" without replacing the camera of the image transmission/reception system in which the existing QSFP active optical cable is used. As such, in the active optical cable 90, it is possible to effectively utilize the existing image transmission/reception system and to reduce a cost for achieving the "completely optical configuration" of the active optical cable. Note that the configuration of this modification example (in which the camera 130 includes the power source section 136, the voltage conversion section 115 of the camera-side connector 91 of the active optical cable 90 receives electric power from the power source section 136 of the camera 130 via the first electric power line 95a) is applicable not only to the image transmission/reception system 1 described in Embodiment 1 but also to the image transmission/reception systems 2 through 4 described in Embodiments 2 through 4. By applying the configuration of this modification example, it is possible to achieve the "completely optical configuration" in the active optical cables 20, 50, and 70 included in the image transmission/reception systems 2 through 4.

[Main Points]

In order to attain the object, the image transmission/reception system in accordance with an aspect of the present invention includes: an active cable which has an end that is provided with a transmission-side connector and has the other end that is provided with a reception-side connector; an image transmission device which is connected with the transmission-side connector; and an image reception device which is connected with the reception-side connector, the transmission-side connector including a supplying section which supplies, to the image transmission device, internal information that is indicative of an internal state of the transmission-side connector, and the image transmission device including a superimposing section which superimposes the internal information, which has been obtained from the transmission-side connector, on an image signal which is to be transmitted to the image reception device via the active cable.

According to the configuration, the internal information can be transmitted from the transmission-side connector to the image reception device with use of an existing transmission path (e.g., optical fiber) for transmitting the image signal. It is therefore possible to provide the image transmission/reception system which does not require a transmission path which directly connects a control section (corresponding to the foregoing "camera-side MCU") embedded in the transmission-side connector with a control section (corresponding to the foregoing "grabber-side MCU") embedded in the reception-side connector in order to transmit the internal information from the transmission-side connector to the image reception device.

Note that the internal state can be, for example, a temperature inside the transmission-side connector. Moreover, the internal state also encompasses an electric current or a voltage which is to be inputted to an active element embedded in the transmission-side connector and an electric current or a voltage which is to be outputted from the active element.

In the image transmission/reception system in accordance with an aspect of the present invention, it is preferable that the image reception device includes a separating section which separates the internal information from the image signal which has been received from the image transmission device via the active cable.

According to the configuration, the image reception device can carry out various processes with reference to the internal information which has been transmitted from the transmission-side connector. For example, the image reception device can control the transmission-side connector or control the reception-side connector with reference to the internal information.

In the image transmission/reception system in accordance with an aspect of the present invention, it is preferable that the supplying section supplies the internal information to the image transmission device by superimposing the internal information on an image transmission device control signal which is used to control the image transmission device and is supplied to the image transmission device.

According to the configuration, it is not necessary to provide a connection terminal for supplying the internal information to the image transmission device in addition to a connection terminal for supplying the image transmission device control signal to the image transmission device. It is therefore possible to simplify the structure of the transmission-side connector.

In the image transmission/reception system in accordance with an aspect of the present invention, it is preferable that the image reception device includes a superimposing/inserting section which superimposes a connector control signal on an image transmission device control signal or inserts the connector control signal into a no-signal period of the image transmission device control signal, the connector control signal being used to control the transmission-side connector, and the image transmission device control signal being (i) used to control the image transmission device and (ii) transmitted to the image transmission device via the active cable.

According to the configuration, it is not necessary to provide a connection terminal for supplying the connector control information to the image reception device in addition to a connection terminal for supplying the image transmission device control signal to the image transmission device (via the image reception device). It is therefore possible to simplify the structure of the reception-side connector.

In the image transmission/reception system in accordance with an aspect of the present invention, it is preferable that the image transmission device further includes a separating section which separates the connector control signal from the image transmission device control signal which has been received from the image reception device via the active cable and supplies the connector control signal, which has been separated, to the transmission-side connector.

According to the configuration, the transmission-side connector can control itself (i.e., the transmission-side connector) with reference to the connector control signal which has been transmitted from the image reception device.

In the image transmission/reception system in accordance with an aspect of the present invention, it is preferable that the transmission-side connector includes a separating section which separates the connector control signal from the image transmission device control signal which has been received from the image reception device via the active cable.

According to the configuration, the transmission-side connector can control itself (i.e., the transmission-side connector) with reference to the connector control signal which has been transmitted from the image reception device.

In the image transmission/reception system in accordance with an aspect of the present invention, it is preferable that the active cable is an active optical cable which includes an optical fiber for transmitting the image signal and another optical fiber for transmitting the image transmission device control signal.

According to the configuration, it is possible to transmit or receive all of the image signal, the internal information, the image transmission device control signal, and the connector control signal with use of the optical fibers. It is therefore possible to provide the active cable which is lighter in weight and more flexible, as compared with a case where all of or part of those signals are transmitted or received with use of a metal cable.

In the image transmission/reception system in accordance with an aspect of the present invention, it is preferable that each of the transmission-side connector and the reception-side connector includes N pieces (N is an integer that is 2 or more) of light emitting sections; the image transmission device control signal is subjected to electrical/optical conversion that is carried out with use of M pieces (M is an integer that is 1 or more and N−1 or less) of light emitting sections among the N pieces of light emitting sections provided in the reception-side connector; and among the N pieces of light emitting sections provided in the reception-side connector, (N−M) pieces of light emitting sections which are not used in the electrical/optical conversion of the image transmission device control signal are set to be disabled.

A QSFP active optical cable which is an example of an existing active optical cable employs a configuration in which each of a transmission-side connector and a reception-side connector has four (N=4) light emitting sections. By applying the configuration of the QSFP active optical cable to the image transmission/reception system in accordance with an aspect of the present invention, it is possible to provide the active cable which has compatibility with the QSFP active optical cable and has commonality of configurations of the transmission-side connector and the reception-side connector. This makes it possible to reduce a cost of manufacturing the active cable which has compatibility with the QSFP active optical cable. Further, according to the configuration, at least one light emitting section among the four light emitting sections included in the reception-side connector can be set to be disabled. It is therefore possible to reduce power consumption by the reception-side connector, as compared with a case where all the light emitting sections are not set to be disabled.

Moreover, a CXP active optical cable which is an example of an existing active optical cable employs a configuration in which each of a transmission-side connector and a reception-side connector has 12 (N=12) light emitting sections. By applying the configuration of the CXP active optical cable to the image transmission/reception system in accordance with an aspect of the present invention, it is possible to provide the active cable which has compatibility with the CXP active optical cable and has commonality of configurations of the transmission-side connector and the reception-side connector. This makes it possible to reduce a cost of manufacturing the active cable which has compatibility with the CXP active optical cable. Further, according to the configuration, at least one light emitting section among the 12 light emitting sections included in the reception-side connector can be set to be disabled. It is therefore possible to reduce power consumption by the reception-side connector, as compared with a case where all the light emitting sections are not set to be disabled.

In the image transmission/reception system in accordance with an aspect of the present invention, it is preferable that each of the image transmission device and the image reception device includes (i) a first power source section for supplying electric power to the transmission-side connector and (ii) a second power source section for supplying electric power to the reception-side connector.

According to the configuration, electric power is supplied from the image transmission device to the transmission-side connector, and electric power is supplied from the image reception device to the reception-side connector. Therefore, in a case where electric power is supplied from the image reception device to the transmission-side connector, it is possible to omit a metal wire (electric power line) that is provided between the reception-side connector and the transmission-side connector. As such, it is possible to achieve a "completely optical configuration" in the active optical cable. By the "completely optical configuration" in the active optical cable, it is possible to increase flexibility, reduce a diameter, and reduce a weight of a cable part, as compared with an active optical cable which includes a metal wire.

In order to attain the object, the active cable monitoring method in accordance with an aspect of the present invention is an active cable monitoring method for causing an image reception device to monitor a transmission-side connector in an image transmission/reception system which includes (i) an active cable which has an end that is provided with the transmission-side connector and the other end that is provided with a reception-side connector, (ii) an image transmission device which is connected with the transmission-side connector, and (iii) the image reception device which is connected with the reception-side connector, the active cable monitoring method including the steps of: causing the transmission-side connector to supply, to the image transmission device, internal information that is indicative of an internal state of the transmission-side connector; and causing the image transmission device to superimpose the internal information, which has been obtained from the transmission-side connector, on an image signal which is to be transmitted to the image reception device via the active cable.

According to the configuration, the internal information can be transmitted from the transmission-side connector to the image reception device with use of an existing transmission path (e.g., optical fiber) for transmitting the image signal. It is therefore possible to provide the image transmission/reception system which does not require a transmission path which directly connects a control section (corresponding to the foregoing "camera-side MCU") embedded in the transmission-side connector with a control section (corresponding to the foregoing "grabber-side MCU") embedded in the reception-side connector in order to transmit the internal information from the transmission-side connector to the image reception device.

In order to attain the object, the active cable control method in accordance with an aspect of the present invention is an active cable control method for causing an image reception device to control a transmission-side connector in an image transmission/reception system which includes (i) an active cable which has an end that is provided with the transmission-side connector and the other end that is provided with a reception-side connector, (ii) an image transmission device which is connected with the transmission-side connector, and (iii) the image reception device which is connected with the reception-side connector, said active cable control method comprising the step of: causing the image reception device to superimpose a connector control signal on an image transmission device control signal, the connector control signal being used to control the transmission-side connector, and the image transmission device control signal being (i) used to control the image transmission device and (ii) transmitted to the image transmission device via the active cable; or causing the image reception device to insert the connector control signal into a no-signal period of the image transmission device control signal.

According to the configuration, the connector control signal can be transmitted from the image reception device to the image transmission device with use of an existing transmission path (e.g., differential line) for transmitting the image transmission device control signal. It is therefore possible to provide the image transmission/reception system which does not require a transmission path which directly connects a control section (corresponding to the foregoing "camera-side MCU") embedded in the transmission-side connector with a control section (corresponding to the foregoing "grabber-side MCU") embedded in the reception-side connector in order to transmit the connector control signal from the image reception device to the image transmission device.

In order to attain the object, the image transmission device in accordance with an aspect of the present invention is an image transmission device which is connectable to a transmission-side connector that is provided at an end of an active cable, the active cable having the other end that is provided with a reception-side connector, the image transmission device including: an obtaining section which obtains, from the transmission-side connector, internal information that is indicative of an internal state of the transmission-side connector; and a superimposing section which superimposes the internal information, which has been obtained from the transmission-side connector, on an image signal which is to be transmitted to the image reception device that is connected with the reception-side connector via the active cable.

The active cable in accordance with an aspect of the present invention is an active cable having an end that is provided with a transmission-side connector and the other end that is provided with a reception-side connector, in which: the transmission-side connector includes a supplying section which supplies, to an image transmission device connected with the transmission-side connector, internal information that is indicative of an internal state of the transmission-side connector.

According to the configuration, the internal information can be transmitted from the transmission-side connector to the image reception device with use of an existing transmission path (e.g., optical fiber) for transmitting the image signal. It is therefore possible to provide the image transmission/reception system which does not require a transmission path which directly connects a control section (corresponding to the foregoing "camera-side MCU") embedded in the transmission-side connector with a control section (corresponding to the foregoing "grabber-side MCU") embedded in the reception-side connector in order to transmit the internal information from the transmission-side connector to the image reception device.

In order to attain the object, the image reception device in accordance with an aspect of the present invention is an image reception device which is connectable to a reception-side connector that is provided at an end of an active cable, the active cable having the other end that is provided with a transmission-side connector, the image reception device including: a superimposing/inserting section which superimposes a connector control signal on an image transmission device control signal or inserts the connector control signal into a no-signal period of the image transmission device control signal, the connector control signal being used to control the transmission-side connector, and the image transmission device control signal being (i) used to control an image transmission device that is connected with the transmission-side connector and (ii) transmitted to the image transmission device via the active cable.

According to the configuration, the connector control signal can be transmitted from the image reception device to the image transmission device with use of an existing transmission path (e.g., differential line) for transmitting the image transmission device control signal. It is therefore possible to provide the image transmission/reception system which does not require a transmission path which directly connects a control section (corresponding to the foregoing "camera-side MCU") embedded in the transmission-side connector with a control section (corresponding to the foregoing "grabber-side MCU") embedded in the reception-side connector in order to transmit the connector control signal from the image reception device to the image transmission device.

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention is applicable to an image transmission device, an image reception device, and an active cable for connecting the image transmission device with the image reception device. Moreover, the present invention is applicable to an image transmission/reception system including the image transmission device, the image reception device, and the active cable. Further, the present invention is applicable to an active cable monitoring method and an active cable control method.

REFERENCE SIGNS LIST

1, 2, 3, 4, 5, 5', 9: Image transmission/reception system
10, 20, 50, 70, 90: Active optical cable (active cable)
11, 51, 71, 81, 85: Camera-side connector (transmission-side connector)
111, 511: Camera-side controller
111a, 221a: Internal information supplying section (supplying section)
12, 22, 72, 82, 86: Grabber-side connector (reception-side connector)
13: Downstream optical fiber
14, 74: Upstream optical fiber
15: Electric power line
121, 221: Grabber-side controller
111c, 221c: MUX/encoder (superimposing section)
30, 60, 130: Camera (image transmission device)
31, 61: Camera controller
311: Decoder (separating section)
312: Connector control section (separating section, obtaining section)
35: MUX (superimposing section)
40: Grabber (image reception device)
41: Grabber controller
411: Encoder (superimposing section)
42: DEMUX (separating section)
412: Connector control section
80, 80': Active metal cable (active cable)
83, 87: Downstream differential line
84: Upstream differential line
95a: First electric power line
95b: Second electric power line
136: Power source section

The invention claimed is:

1. An image transmission/reception system comprising:
an active cable which has an end that is provided with a transmission-side connector and has the other end that is provided with a reception-side connector;
an image transmission device which is connected with the transmission-side connector; and
an image reception device which is connected with the reception-side connector,
the transmission-side connector including a supplying section which supplies, to the image transmission device, internal information that is indicative of an internal state of the transmission-side connector, and
the image transmission device including a superimposing section which superimposes the internal information, which has been obtained from the transmission-side connector, on an image signal which is to be transmitted to the image reception device via the active cable,
the supplying section and the image transmission device are connected with each other via a signal line which allows for two-way communications, and the supplying section supplies the internal information to the image transmission device via the signal line.

2. The image transmission/reception system as set forth in claim 1, wherein:
the image reception device includes a separating section which separates the internal information from the image signal which has been received from the image transmission device via the active cable.

3. The image transmission/reception system as set forth in claim 1 wherein:
the supplying section supplies the internal information to the image transmission device by superimposing the internal information on an image transmission device control signal which is used to control the image transmission device and is supplied to the image transmission device.

4. The image transmission/reception system as set forth in claim 3, wherein:
the active cable is an active optical cable which includes an optical fiber for transmitting the image signal and another optical fiber for transmitting the image transmission device control signal.

5. The image transmission/reception system as set forth in claim 4, wherein:
each of the image transmission device and the image reception device includes (i) a first power source section for supplying electric power to the transmission-side connector and (ii) a second power source section for supplying electric power to the reception-side connector.

6. The image transmission/reception system as set forth in claim 3:
each of the transmission-side connector and the reception-side connector includes N pieces (N is an integer that is 2 or more) of light emitting sections;
the image transmission device control signal is subjected to electrical/optical conversion that is carried out with use of M pieces (M is an integer that is 1 or more and N−1 or less) of light emitting sections among the N pieces of light emitting sections provided in the reception-side connector; and
among the N pieces of light emitting sections provided in the reception-side connector, (N−M) pieces of light emitting sections which are not used in the electrical/ optical conversion of the image transmission device control signal are set to be disabled.

7. The image transmission/reception system as set forth in claim 1, wherein:

the image reception device includes a superimposing/inserting section which superimposes a connector control signal on an image transmission device control signal or inserts the connector control signal into a no-signal period of the image transmission device control signal, the connector control signal being used to control the transmission-side connector, and the image transmission device control signal being (i) used to control the image transmission device and (ii) transmitted to the image transmission device via the active cable.

8. The image transmission/reception system as set forth in claim 7, wherein:

the image transmission device further includes a separating section which separates the connector control signal from the image transmission device control signal which has been received from the image reception device via the active cable and supplies the connector control signal, which has been separated, to the transmission-side connector.

9. The image transmission/reception system as set forth in claim 7, wherein:

the transmission-side connector includes a separating section which separates the connector control signal from the image transmission device control signal which has been received from the image reception device via the active cable.

10. The image transmission/reception system as set forth in claim 1, wherein the supplying section and a camera controller included in the image transmission device are connected with each other via the signal line, and the supplying section supplies the internal information to the camera controller via the signal line.

11. The image transmission/reception system as set forth in claim 10, wherein the camera controller is configured to supply the internal information which has been received from the supplying section, to the superimposing section.

12. An image transmission device which is connectable to a transmission-side connector that is provided at an end of an active cable, the active cable having the other end that is provided with a reception-side connector, said image transmission device comprising:

an obtaining section which obtains, from the transmission-side connector, internal information that is indicative of an internal state of the transmission-side connector; and a superimposing section which superimposes the internal information, which has been obtained from the transmission-side connector, on an image signal which is to be transmitted to an image reception device in a case where the image reception device is connected with the reception-side connector via the active cable.

13. An image reception device which is connectable to a reception-side connector that is provided at an end of an active cable, the active cable having the other end that is provided with a transmission-side connector, said image reception device comprising:

a superimposing/inserting section which superimposes a connector control signal on an image transmission device control signal or inserts the connector control signal into a no-signal period of the image transmission device control signal, the connector control signal being used to control the transmission-side connector, and the image transmission device control signal being (i) used to control an image transmission device in a case where the image transmission device is connected with the transmission-side connector and (ii) transmitted to the image transmission device via the active cable.

14. An active cable having an end that is provided with a transmission-side connector and the other end that is provided with a reception-side connector, wherein:

the transmission-side connector includes a supplying section which supplies internal information that is indicative of an internal state of the transmission-side connector to an image transmission device in a case where the image transmission device is connected with the transmission-side connector, and the supplying section supplies the internal information to the image transmission device by superimposing the internal information on an image transmission device control signal that is used to control the image transmission device and that is supplied to the image transmission device.

* * * * *